United States Patent
Yonemura et al.

(10) Patent No.: US 9,280,518 B2
(45) Date of Patent: Mar. 8, 2016

(54) PUBLIC KEY CRYPTOGRAPHY COMPUTING DEVICE

(71) Applicants: Tomoko Yonemura, Kanagawa (JP); Hirofumi Muratani, Kanagawa (JP); Yoshikazu Hanatani, Kanagawa (JP)

(72) Inventors: Tomoko Yonemura, Kanagawa (JP); Hirofumi Muratani, Kanagawa (JP); Yoshikazu Hanatani, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 275 days.

(21) Appl. No.: 13/727,070

(22) Filed: Dec. 26, 2012

(65) Prior Publication Data
US 2013/0246489 A1 Sep. 19, 2013

(30) Foreign Application Priority Data
Mar. 15, 2012 (JP) ................. 2012-059235

(51) Int. Cl.
*G06F 17/11* (2006.01)
*H04L 9/30* (2006.01)
*G06F 7/72* (2006.01)

(52) U.S. Cl.
CPC ............. *G06F 17/11* (2013.01); *H04L 9/3093* (2013.01); *G06F 7/724* (2013.01)

(58) Field of Classification Search
None
See application file for complete search history.

(56) References Cited

U.S. PATENT DOCUMENTS

| | | | | |
|---|---|---|---|---|
| 5,467,297 A | * | 11/1995 | Zook ............................ | 708/492 |
| 5,964,826 A | * | 10/1999 | Wei .............................. | 708/492 |
| 6,389,442 B1 | * | 5/2002 | Yin et al. ...................... | 708/492 |
| 2003/0135530 A1 | * | 7/2003 | Parthasarathy et al. ....... | 708/492 |
| 2011/0246548 A1 | * | 10/2011 | Yen .............................. | 708/492 |
| 2012/0150931 A1 | | 6/2012 | Hanatani et al. | |

OTHER PUBLICATIONS

T. Yonemura et al., "Alternative Decompression Maps for Trace Representation of Algebraic Tori", SCIS 2012, 29th Symposium on Cryptography and Information Security, Jan. 30-Feb. 2, pp. 1-6 (2012).
K. Karabina, "Factor-4 and 6 compression of cyclotomic subgroups of $F^*/2^{4m}$ and $F^*/3^{8m}$", J. Math. Cryptol. 4, pp. 1-42 (2010).

* cited by examiner

*Primary Examiner* — Michael D Yaary
(74) *Attorney, Agent, or Firm* — Finnegan, Henderson, Farabow, Garrett & Dunner, L.L.P.

(57) ABSTRACT

According to an embodiment, a computing device includes a receiving unit, a calculating unit, a solving unit, a selecting unit, and a determining unit. The receiving unit is configured to receive pieces of input data indicative of elements of a subgroup of a multiplicative group in a finite field and pieces of first additional data for identifying conjugates of the respective pieces of input data. The elements are represented by traces. The calculating unit is configured to calculate a coefficient of an equation based on the pieces of input data. The solving unit is configured to obtain solutions of the equation. The selecting unit is configured to select one of the solutions as a result of computation, based on the first additional data. The determining unit is configured to determine second additional data for identifying a conjugate of the selected result of computation based on the first additional data.

3 Claims, 3 Drawing Sheets

PUBLIC KEY CRYPTOGRAPHY COMPUTING DEVICE

CROSS-REFERENCE TO RELATED APPLICATIONS

This application is based upon and claims the benefit of priority from Japanese Patent Application No. 2012-059235, filed on Mar. 15, 2012; the entire contents of which are incorporated herein by reference.

FIELD

Embodiments described herein relate generally to a computing device.

BACKGROUND

A public key cryptography technique ensures secure communication without sharing a key in advance. This technique has a problem of increasing size of the cryptosystem. Under the circumstance, a proposed method employs an algebraic torus so as to compress the size of the cryptosystem in the public key cryptography. Representation of elements of the algebraic torus includes trace representation, projective representation, and extension field representation. The trace representation is known to use an exponentiation algorithm, but multiplication is assumed not to be available. Therefore, the public key cryptography with algebraic torus has employed the trace representation for input and output in respective steps of key generation, encryption, and decryption. The public key cryptography has employed the projective representation or the extension field representation for computation. In view of this, there is a need for a conversion (representation conversion) between the respective representations before and after the computation.

However, such a conventional technique increases in calculation amount in the representation conversion depending on a combination of representations before and after the conversion. This may considerably increase the amount of calculation including representation conversion and computation.

DETAILED DESCRIPTION

According to an embodiment, a computing device includes a receiving unit, a coefficient calculating unit, a solving unit, a selecting unit, a determining unit, and an output unit. The receiving unit is configured to receive a plurality of pieces of input data indicative of elements of a subgroup of a multiplicative group in a finite field and a plurality of pieces of first additional data for identifying conjugates of the respective pieces of input data. The elements are represented by traces. The coefficient calculating unit is configured to calculate a coefficient of an equation based on the pieces of input data. The equation has a solution that is a possible value as a result of a predetermined computation performed on the pieces of input data. The solving unit is configured to obtain a plurality of solutions of the equation having the calculated coefficient. The selecting unit is configured to select one of the solutions as the result of the predetermined computation, based on the pieces of first additional data. The determining unit is configured to determine second additional data for identifying a conjugate of the selected result of the predetermined computation, based on the pieces of first additional data. The output unit is configured to output the selected result of the predetermined computation and the second additional data.

A computing device according to a preferred embodiment of the present invention will be described in detail below by referring to the accompanying drawings.

First Embodiment

Figure 1:
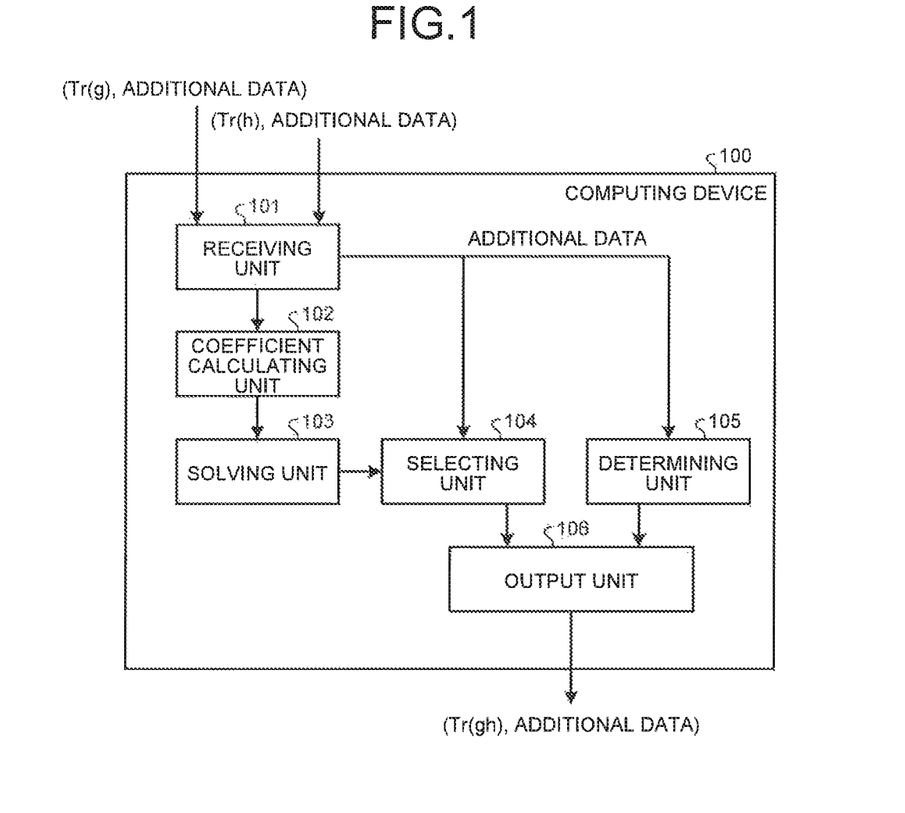
FIG. 1 is a block diagram illustrating a computing device according to a first embodiment.

FIG. 1 is a block diagram illustrating an exemplary configuration of a computing device 100 according to a first embodiment. As illustrated in FIG. 1, the computing device 100 includes a receiving unit 101, a coefficient calculating unit 102, a solving unit 103, a selecting unit 104, a determining unit 105, and an output unit 106.

The receiving unit 101 receives input data to be used for computation. For example, the receiving unit 101 receives multiple pieces of input data, which are used for computation, and additional data (first additional data) for each piece of input data. The pieces of input data are elements of a subgroup of a multiplicative group in a finite field (an algebraic torus in a finite field representation), which are expressed by their traces. Hereinafter, a element g of an algebraic torus in the trace representation will be written as a trace Tr(g). The additional data is used to identify conjugates of each corresponding input data.

The coefficient calculating unit 102 calculates a coefficient of an equation (polynomial) that has a solution that is a possible value of a result of a predetermined computation where multiple pieces of input data are used. Hereinafter, as an example of the predetermined computation, a multiplicative process of multiple pieces of input data will be described. However, the computation is not limited to this process. For example, a similar method may be applicable to multiplicative processes that include a multiplicative process where the Frobenius map is applied for one of the multiple pieces of input data and another process for the other piece of input data. Alternatively, a similar method may be applicable to multiplicative processes where the Frobenius map is applied for the multiple pieces of input data.

The solving unit 103 obtains multiple solutions of the polynomial that has the calculated coefficient. The solving unit 103 is able to solve the polynomial to obtain its solution (root) with any conventional algorithm. For example, the quadratic formula, the cubic formula, Berlekamp's algorithm to obtain a solution in the finite field, or a similar algorithm may be used. Multiple solutions include not only a solution that expresses an actual result of a computation (such as a multiplicative process) for multiple pieces of input data, but also a solution other than the solution.

The selecting unit 104 selects one of the multiple solutions, as a result of the computation, based on the received additional data.

The determining unit 105 uses multiple pieces of additional data for the respective pieces of input data so as to determine additional data (second additional data) that is used to identify a conjugate of the solution selected as a result of the computation.

The output unit 106 outputs the selected solution (the result of the computation) and additional data for this solution.

Figure 2:
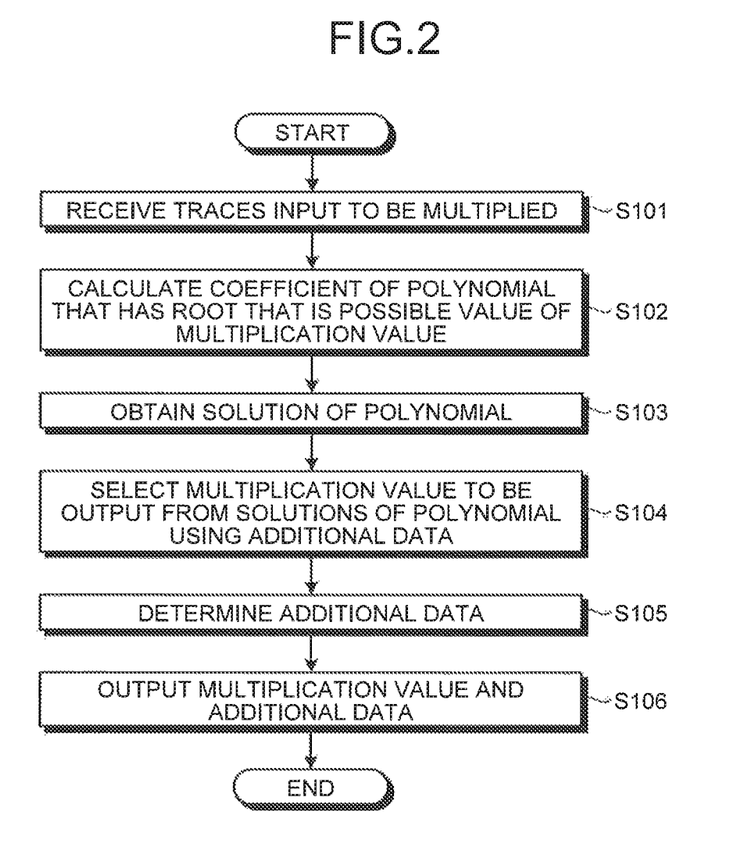
FIG. 2 is a flowchart of a computation according to the first embodiment.

Next, the computation executed by the computing device 100 according to the first embodiment, which is configured as described above, will be described by referring to FIG. 2. FIG. 2 is a flowchart of an entire computation according to the first embodiment.

The receiving unit 101 receives input of multiple pieces of input data (traces in other words) to be multiplied, and additional data for each trace (step S101). The coefficient calculating unit 102 calculates a coefficient of a polynomial that has a solution (root) as a possible value of a result of the multiplication (multiplication value in other words) of multiple traces (step S102). The solving unit 103 obtains a solution of the polynomial that has the calculated coefficient (step S103).

The selecting unit 104 selects a solution to be output as a result of the multiplication (which is also referred to as multiplication value) of multiple traces, from the obtained multiple solutions, using the received additional data (step S104).

On the other hand, the determining unit 105 uses the received, additional data to determine additional data for the selected solution (multiplication value) (step S105). The step S102 to the step S104, and the step S105 do not need to be executed in the order illustrated in FIG. 2. These steps may be executed in reverse order, and may be executed concurrently.

The output unit 106 outputs the selected multiplication value, and the determined additional data for the multiplication value (step S106), and then exits the computation.

In the following description, the computation will be described in more detail. First, relevant mathematical background for computation in an algebraic torus according to this embodiment will be described. Let $F_{p^m}$ be a finite field where an algebraic torus $T_n$ is defined. Here, assume that p is a prime, and n and m are positive integers. $F_{p^m}$ denotes a finite field where the number of elements is $p^m$. An algebraic torus $T_n(F_{p^m})$ is a group where the number of elements is $\Phi_n(p^m)$. Here, $\Phi_n(X)$ is an nth cyclotomic polynomial (polynomial dividing a circumference equally by n). A trace representation of the algebraic torus $T_n(F_{p^m})$ is expressed by a combination of $\phi(n)$ elements of $F_{p^m}$. Here, $\phi(x)$ is an Euler function. A trace representation of a subgroup $G_\pm$ in an algebraic torus is expressed by a combination of $\phi(n)/2$ elements of $F_{p^m}$.

Exemplary subgroups $G_\pm$ for n=4 and n=6 will be described as follows.

A trace representation of an element g of the algebraic torus $T_n(F_{p^m})$ is expressed by traces $Tr(g)$ and $Tr(g^{p^m+1})$. A trace map Tr is a map expressed in Equation (1) below.

$$Tr(g) = \sum_i \pi^i(g) \qquad (1)$$

Here, the Frobenius map $\pi$ is expressed, as $\pi: x \to x^{p^m}$ where i=0, 1, ..., and n−1. $Tr(g)$ is an element of $F_{p^m}$. A polynomial expressed in Expression (2) below, which has the element g and Frobenius conjugates of the element, g as its roots, is called a characteristic polynomial.

$$\prod_i \{X - \pi^i(g)\} \qquad (2)$$

The characteristic polynomial is an expression of degree n, which has a coefficient $F_{p^m}$. If n=2, then, the characteristic polynomial is expressed as $X^2 - Tr(g)X + 1$. If n=4, then the characteristic polynomial is expressed in Expression (3) below.

$$X^4 - Tr(g)X^3 + \{Tr(g^{p^m+1}) + 2\}X^2 - Tr(g)X + 1 \qquad (3)$$

If n=6, then the characteristic polynomial is expressed in Expression (4) below.

$$X^6 - Tr(g)X^5 + \{Tr(g^{p^m+1}) + Tr(g) + 3\}X^4 - \{Tr(g^2) + 2Tr(g) + 2\}X^3 + \ldots + 1 \qquad (4)$$

Here, $Tr(g)^2 = 2Tr(g^{p^m+1}) + Tr(g^2) + 2Tr(g) + 6$. The quadratic coefficient of X is equal to the quartic coefficient of X, and the linear coefficient of X is equal to the quintic coefficient of X. Accordingly, the coefficients of the characteristic, polynomial are determined by the traces $Tr(g)$ and $Tr(g^{p^m-1})$. Obtaining a root of the characteristic polynomial yields the element g and the conjugates of the element g in the extension field representation.

Next, a description will be given of the subgroup $G_\pm$. The subgroup $G_\pm$ is a group where the number of elements is $p^m \pm \sqrt{p^{m+1}} + 1$. If m is an odd number, and n=4 and p=2 or n=6 and p=3, the subgroup $G_\pm$ is a subgroup of the algebraic torus $T_n(F_{p^m})$.

The trace representation of the element g of the subgroup $G_\pm$ is expressed by the trace $Tr(g)$. Since the element g of the subgroup $G_\pm$ is calculated as $$Tr(g^{p^m+2}) = Tr(g^{\sqrt{p^{m+2}}}),$$

the coefficient of the characteristic polynomial is determined by the trace $Tr(g)$ only.

Note that the trace map and the exponentiation of an exponent, which, is the exponentiation of the characteristic p, are exchanged.

When the trace representation is combined with the element g and the additional data, which is used to identify the conjugate of the element g, the trace $Tr(g)$ is uniquely converted to the element g in the extension field representation by obtaining a root of the characteristic polynomial with the trace $Tr(g)$.

To identify n conjugates, two-bit additional data is used for n=4, $\log_2(6)$-bit additional data is used for n=6, and $\log_2(n)$-bit additional data is generally used.

Next, a multiplication method in the trace representation will be described. The multiplication in the trace representation means calculating the multiplication value Tr(gh) and the additional data for the multiplication value Tr(gh), from the trace Tr(g), the additional data for the trace Tr(g), the trace Tr(h), and the additional data for Tr(h), without converting them to the extension field representation g and h.

Assume that the coefficients of the characteristic polynomial are determined by Tr(g) only. As for the subgroup of the algebraic torus $T_n(F_{p^m})$, n possible multiplication values of $Tr(\pi^i(g)h)$ exist. Accordingly; the selecting unit 104 simply selects an appropriate multiplication value from n possible values using the additional data input.

In view of this, the coefficient calculating unit 102 first calculates coefficients of a polynomial, which has a root that is a possible value of the multiplication value, from Tr(g) and Tr(h). Then, the solving unit 103 obtains a root of the polynomial, and the selecting unit 104 selects the multiplication value from the obtained roots. Thus, the multiplication of Tr(g) and Tr(h) is configured.

The polynomial is an expression of degree n, which has a coefficient $F_{p^m}$, and is simply solved with $F_{p^m}$ to obtain a root. On the other hand, the characteristic polynomial is also an expression of degree n, which has a coefficient $F_{p^m}$. However, the characteristic polynomial needs to be solved in the large extension field $F_{(p^m)^n}$ to obtain a root for the element g of the algebraic torus $T_n(F_{p^m})$. As the space of the solutions of the equation is narrower, the multiplication in the trace representation is faster than the case where the multiplication is performed after the conversion to the extension field representation.

If n=2, then the polynomial that has a roof that is a possible value of the multiplication value of the element g and the element h of the algebraic torus $T_n(F_{p^m})$ is expressed as follows:

$$\{Y-Tr(gh)\}\{Y-Tr(\pi(g)h)\}=Y^2-Tr(g)Tr(h)Y+\{Tr(g)^2+Tr(h)^2-4\}$$

The coefficients of (n−1) of Y are $Tr(gh)+Tr(\pi(g)h)+\ldots+Tr(\pi^{n-1}(g)h)=Tr(g)Tr(h)$, regardless of the value of n. As for a constant term, use of $g^{p^m+1}=1$ and $h^{p^m-1}=1$ yields $Tr(gh)Tr(\pi(g)h)=Tr(g^2)+Tr(h^2)$. A recurrence equation of the trace obtained by the characteristic polynomial yields $Tr(g^2)=Tr(g)^2-2$ and $Tr(h^2)=Tr(h)^2-2$. Accordingly, the polynomial described above is obtained.

In view of this, the coefficient of the polynomial that has a root that is a possible value of the multiplication value is determined by the traces Tr(g) and Tr(h) only. Then, obtaining the root of the polynomial yields the possible value of the multiplication value.

In the following description, an exemplary recurrence equation will be described. Substituting g into X in the characteristic polynomial for n=2, $X^2-Tr(g)X+1=0$, gives $g^2-Tr(g)g+1=0$. The trace representation of this equation is expressed as $Tr(g^2)-Tr(g)^2+2=0$. Here, Tr(1)=2 is used. Accordingly, a recurrence equation, $Tr(g^2)=Tr(g)^2-2$, is obtained. Similarly, a recurrence equation is generally expressed as $Tr(g^i+1)=Tr(g^i)Tr(g)-Tr(g^i-1)$.

If n=4, the polynomial that has a root, that is a possible value of the multiplication value of the element g and the element h of the subgroup $G_\pm$ of the algebraic torus is expressed in Equation (5) below.

$$\{Y - Tr(gh)\}\{Y - Tr(\pi(g)h)\}\{Y - Tr(\pi^2(g)h)\}\{Y - Tr(\pi^3(g)h)\} = \quad (5)$$
$$Y^4 - Tr(g)Tr(h)Y^3 + d_2(g, h)Y^2 + d_3(g, h)Y + d_4(g, h)$$

$$d_2(g, h) = Tr(g)^2 Tr(h)^{\sqrt{2p^m}} +$$
$$Tr(g)^{\sqrt{2p^m}} Tr(h)^{\sqrt{2p^m}} + Tr(g)^{\sqrt{2p^m}} Tr(h)^2$$

-continued
$$d_3(g, h) = Tr(g)Tr(h^3) + Tr(g^3)Tr(h) +$$
$$Tr(g^{p^m+2})Tr(h^{p^m+2}) + Tr(g^{2p^m+1})Tr(h^{2p^m+1})$$

$$d_4(g, h) = Tr(g)^4 + Tr(h)^4 + Tr(g)^2 Tr(h)^{2\sqrt{2p^m}} +$$
$$Tr(g)^{2\sqrt{2p^m}} Tr(h)^2 + \{Tr(g)^2 + Tr(h)^2\}Tr(g)^{\sqrt{2p^m}} Tr(h)^{\sqrt{2p^m}}$$

Here, the recurrence equation of the trace obtained by the characteristic polynomial yields $Tr(g^3)=Tr(g^2)Tr(g)+Tr(g^{p^m+1})Tr(g)+Tr(g)$. Due to $Tr(g^2)=Tr(g)^2$ and $$Tr(g^{p^m+1}) = Tr(g)^{\sqrt{p^{m+2}}},$$

$Tr(g^3)$ is calculated from the trace Tr(g) only. $Tr(h^3)$ is also calculated similarly. The sum and the product of $Tr(g^{p^m+2})$ and $Tr(g^{2p^m+1})$ are expressed in Equation (6) below.

$$Tr(g^{p^m+2}) + Tr(g^{2p^m+1}) = Tr(g)Tr(g)^{\sqrt{2p^m}} \quad (6)$$
$$Tr(g^{p^m+2})Tr(g^{2p^m+1}) = Tr(g^3)^{\sqrt{2p^m}} + Tr(g)^4 + Tr(g)^2 + Tr(g)^{\sqrt{2p^m}}$$

$Tr(g^{p^m+2})$ and $Tr(g^{2p^m-1})$ are calculated from the trace Tr(g) only, $Tr(h^{p^m+2})$ and $Tr(h^{2p^m+1})$ are also calculated similarly.

Accordingly, the coefficient of the polynomial that has a root that is a possible value of the multiplication value is determined by the traces Tr(g) and Tr(h) only. Then, obtaining the root of the polynomial yields the possible value of the multiplication value.

If n=6, then the polynomial that has a root that is a possible value of the multiplication value of the element g and the element h of the subgroup $G_\pm$ of the algebraic torus is expressed in Equation (7) to Equation (12) below.

$$\{Y - Tr(gh)\}\{Y - Tr(\pi(g)h)\}\{Y - Tr(\pi^2(g)h)\}\{Y - Tr(\pi^3(g)h)\} \quad (7)$$
$$\{Y - Tr(\pi^4(g)h)\}\{Y - Tr(\pi^5(g)h)\} = Y^6 - Tr(g)Tr(h)Y^5 +$$
$$d_2(g, h)Y^4 + d_3(g, h)Y^3 + d_4(g, h)Y^2 + d_5(g, h)Y + d_6(g, h)$$

$$d_2(g, h) = Tr(g)^2\{Tr(h) + Tr(h)^{\sqrt{3p^m}}\} + \{Tr(g) + Tr(g)^{\sqrt{3p^m}}\}Tr(h)^2 + \quad (8)$$
$$\{Tr(g) - Tr(g)^{\sqrt{3p^m}}\}\{Tr(h) - Tr(h)^{\sqrt{3p^m}}\}$$

$$d_3(g, h) = Tr(g)^3\{Tr(h^2) - Tr(h) - 1\} + \{Tr(g^2) - Tr(g) - 1\}Tr(h)^3 + \quad (9)$$
$$Tr(g^{p^m+2})Tr(h^{p^m+2}) + Tr(g^{2p^m+1})Tr(h^{2p^m+1}) +$$
$$\{Tr(g^{p^m+2}) + Tr(g^{p^m+1})\}\{Tr(h)^{\sqrt{3p^m}} + Tr(h^2) - Tr(h)\} +$$
$$\{Tr(g)^{\sqrt{3p^m}} + Tr(g^2) - Tr(g)\}\{Tr(h^{p^m+2}) + Tr(h^{2p^m+1})\} +$$
$$\{Tr(g^{p^m+2}) + Tr(g^2) + Tr(g)\}Tr(h)^{\sqrt{3p^m}} +$$
$$Tr(g)^{\sqrt{3p^m}}\{Tr(h^{p^m+2}) + Tr(h^2) + Tr(h)\} -$$
$$Tr(g)^{\sqrt{3p^m}} Tr(h)^{\sqrt{3p^m}} + Tr(g)Tr(h)$$

-continued $$d_4(g, h) = \qquad (10)$$
$$Tr(g)Tr(h) - Tr(g^2)Tr(h)^{\sqrt{3p^m}} - Tr(g)^{\sqrt{3p^m}}Tr(h^2) + Tr(g)Tr(h)^3 +$$
$$Tr(g^3)Tr(h) + Tr(g^2)\{Tr(h^3) + Tr(h^{p^m+2}) + Tr(h^{2p^m+1})\} +$$
$$\{Tr(g)^3 + Tr(g^{p^m+2}) + Tr(h^{2p^m+1})\}Tr(h^2) +$$
$$Tr(g)^{\sqrt{3p^m}}\{-Tr(h)^3 + Tr(h^{p^m+2}) + Tr(h^{p^m+1})\} +$$
$$\{-Tr(g)^2 + Tr(g^{2p^m+1}) + Tr(g^{2p^m+1})\}Tr(h)^{\sqrt{3p^m}} +$$
$$\{Tr(g^{p^m+2}) + Tr(g^{p^m+1})\}\{Tr(h^{p^m+1}) + Tr(h^{2p^m+1})\} -$$
$$Tr(g)^3\{Tr(h^{p^m+2}) + Tr(h^{2p^m+1})\} -$$
$$\{Tr(g^{p^m+2}) + Tr()g^{2p^m+1}\}Tr(h)^3 + Tr(g)Tr(h^4) +$$
$$Tr(g^4)Tr(h) + \{-Tr(g) + Tr(g^2)\}\{Tr(h^{p^m+2}) + Tr(h^{2p^m+1})\} +$$
$$\{Tr(g^{p^m+3}) + Tr(g^{3p^m+1})\}\{-Tr(h) + Tr(h^2)\} +$$
$$Tr(g)^{\sqrt{3p^m}}\{Tr(h^4) - Tr(h^{3p^m+3})\} - Tr(h^{3p^m+1})\} +$$
$$\{Tr(g^4) - Tr(g^{p^m+2}) - Tr(g^{3p^m+1})\}Tr(h)^{\sqrt{3p^m}} +$$
$$Tr(g)^3 Tr(h^2)^{\sqrt{3p^m}} + Tr(g^2)^{\sqrt{2p^m}}Tr(h)^2 +$$
$$Tr(g^{2p^m+1})Tr(h^{p^m+3}) + Tr(g^{p^m+3})Tr(h^{2p^m+1}) +$$
$$Tr(g^{p^m+2})Tr(h^{3p^m+1}) + Tr(g^{3p^m+1})Tr(h^{p^m+2})$$

$$d_5(g, h) = Tr(g)Tr(h) + Tr(g)Tr(h^2) + Tr(g^2)Tr(h) + \qquad (11)$$
$$Tr(g)Tr(h^{p^m+1}) + Tr(g^{p^m+1})Tr(h) + 2Tr(g^2)Tr(h^2) +$$
$$Tr(g)Tr(h^2) + Tr(g^3)Tr(h) + 2Tr(g^2)Tr(h^3) + 2Tr(g^2)Tr(h^2) +$$
$$Tr(g^2)Tr(h^{p^m+2}) + Tr(g^{p^m+2})Tr(h^2) + Tr(g^2)Tr(h^{3p^m+1}) +$$
$$Tr(g^{2p^m+1})Tr(h^2) + Tr(g^3)Tr(h^3) + Tr(g^{2p^m+1})Tr(h^{2p^m+1}) +$$
$$Tr(g^{p^m+2})Tr(h^{p^m+2}) + 2Tr(g^2)Tr(h^{p^m+3}) +$$
$$2Tr(g^{p^m+3})Tr(h^2) + Tr(g^2)Tr(h^{2p^m+2}) + Tr(g^{2p^m+2})Tr(h^2) +$$
$$2Tr(g^2)Tr(h^{3p^m+2}) + 2Tr(g^{3p^m+1})Tr(h^2) + Tr(g^{p^m+1})Tr(h^4) +$$
$$Tr(g^4)Tr(h^{p^m+1}) + Tr(g^3)Tr(h^4) + Tr(g^4)Tr(h^3) +$$
$$Tr(g^3)Tr(h^{p^m+3}) + Tr(g^{p^m+3})Tr(h^3) + Tr(g^3)Tr(h^{3p^m+2}) +$$
$$Tr(g^{3p^m+1})Tr(h^3) + Tr(g^{p^m+k})Tr(h^4) + Tr(g^4)Tr(h^{p^m+2}) +$$
$$Tr(g^{2p^m+1})Tr(h^4) + Tr(g^4)Tr(h^{2p^m+1}) + Tr(g^{p^m+2})Tr(h^{p^m+3}) +$$
$$Tr(g^{p^m+3})Tr(h^{p^m+2}) + Tr(g^{p^m+2})Tr(h^{2p^m+2}) +$$
$$Tr(g^{2p^m+2}) + Tr(h^{p^m+2}) + Tr(g^{p^m+2})Tr(h^{3p^m+1}) +$$
$$Tr(g^{3p^m+1})Tr(h^{p^m+2}) + Tr(g^{2p^m+1})Tr(h^{p^m+3}) +$$
$$Tr(g^{p^m+3})Tr(h^{2p^m+1}) + Tr(g^{2p^m+1})Tr(h^{2p^m+2}) +$$
$$Tr(g^{2p^m+2})Tr(h^{2p^m+1}) + Tr(g^{2p^m+1})Tr(h^{3p^m+1}) +$$
$$Tr(g^{3p^m+1})Tr(h^{2p^m+1}) + Tr(g^{p^m+3})Tr(h^{p^m+3}) +$$
$$2Tr(g^{2p^m+2})Tr(h^{2p^m+2}) + 2Tr(g^{3p^m+1})Tr(h^{3p^m+1}) +$$
$$Tr(g)Tr(h^6) + Tr(g^5)Tr(h) + 2Tr(g)Tr(h^{p^m+4}) +$$
$$2Tr(g^{p^m+4})Tr(h) + 2Tr(g)Tr(h^{2p^m+2}) + 2Tr(g^{2p^m+3})Tr(h) +$$
$$2Tr(g)Tr(h^{3p^m+2}) + 2Tr(g^{3p^m+2})Tr(h) + 2Tr(g)Tr(h^{4p^m+1}) +$$
$$2Tr(g^{4p^m+1})Tr(h) + Tr(g^2)Tr(h^{p^m+4}) + Tr(g^{p^m+4})Tr(h^2) +$$
$$Tr(g^2)Tr(h^{2p^m+3}) + Tr(g^{2p^m+3})Tr(h^2) + Tr(g^2)Tr(h^{4p^m+1}) +$$
$$Tr(g^{4p^m+1})Tr(h^2) + Tr(g^{p^m+1})Tr(h^{p^m+4}) + Tr(g^{p^m+4})Tr(h^{p^m+1}) +$$
$$2Tr(g^{p^m+1})Tr(h^{2p^m+3}) + 2Tr(g^{2p^m+3})Tr(h^{p^m+1}) +$$
$$2Tr(g^{p^m+1})Tr(h^{3p^m+2}) + 2Tr(g^{3p^m+2})Tr(h^{p^m+1}) +$$
$$Tr(g^{p^m+1})Tr(h^{4p^m+1}) + Tr(g^{4p^m+1})Tr(h^{p^m+1}) +$$
$$Tr(g^{p^m+2})Tr(h^{p^m+3}) + Tr(g^{2p^m+3})Tr(h^{p^m+2}) +$$
$$Tr(g^{2p^m+2})Tr(h^{3p^m+2}) + Tr(g^{3p^m+2})Tr(h^{2p^m+1})$$

$$d_6(g, h) = Tr(g)Tr(h) + Tr(g)Tr(h^2) + Tr(g^2)Tr(h) + \qquad (12)$$
$$Tr(g^2)Tr(h^{p^m+1}) + Tr(g^{p^m+1})Tr(h^2) + 2Tr(g^{p^m+1})Tr(h^{p^m+1}) +$$
$$Tr(g)Tr(h^3) + Tr(g^3)Tr(h) + 2Tr(g)Tr(h^{p^m+2}) + 2Tr(g^{p^m+2})Tr(h) +$$
$$2Tr(g)Tr(h^{2p^m+1}) + 2Tr(g^{2p^m+1})Tr(h) + Tr(g^2)Tr(h^3) +$$
$$Tr(g^3)Tr(h^2) + Tr(g^2)Tr(h^{p^m+2}) + Tr(g^{p^m+2})Tr(h^2) +$$
$$Tr(g^2)Tr(h^{2p^m+1}) + Tr(g^{2p^m+2})Tr(h^2) + 2Tr(g^{p^m+2})Tr(h^2) +$$
$$2Tr(g^3)Tr(h^{p^m+1}) + 2Tr(g^3)Tr(h^3) + Tr(g^3)Tr(h^{p^m+2}) +$$
$$Tr(g^{p^m+2})Tr(h^3) + Tr(g^3)Tr(h^{2p^m+1}) + Tr(g^{2p^m+1})Tr(h^3) +$$
$$Tr(g^{p^m+2})Tr(h^{p^m+2}) + Tr(g^{2p^m+2})Tr(h^{2p^m+1}) +$$
$$2Tr(g^{p^m+2})Tr(h^{2p^m+1}) + 2Tr(g^{2p^m+1})Tr(h^{p^m+2}) +$$
$$Tr(g)Tr(h^{2p^m+2}) + Tr(g^{2p^m+2})Tr(h) + 2Tr(g^2)Tr(h^4) +$$
$$2Tr(g^4)Tr(h^2) + 2Tr(g^2)Tr(h^{p^m+3}) + 2Tr(g^{p^m+3})Tr(h^2) +$$
$$2Tr(g^2)Tr(h^{3p^m+1}) + 2Tr(g^{3p^m+1})Tr(h^2) + 2Tr(g^{p^m+1})Tr(h^4) +$$
$$2Tr(g^4)Tr(h^{p^m+1}) + Tr(g^{p^m+2})Tr(h^{2p^m+2}) + Tr(g^{2p^m+2})Tr(h^{p^m+1}) +$$
$$Tr(g^3)Tr(h^4) + Tr(g^4)Tr(h^3) + Tr(g^3)Tr(h^{p^m+3}) +$$
$$Tr(g^{p^m+3})Tr(h^3) + Tr(g^3)Tr(h^{2p^m+2}) + Tr(g^{2p^m+2})Tr(h^3) +$$
$$Tr(g^3)Tr(h^{3p^m+1}) + Tr(g^{3p^m+1})Tr(h^3) + 2Tr(g^{p^m+2})Tr(h^{3p^m+1}) +$$
$$2Tr(g^{3p^m+1})Tr(h^{p^m+2}) + 2Tr(g^{2p^m+1})Tr(h^{p^m+3}) +$$
$$2Tr(g^{p^m+2})Tr(h^{2p^m+1}) + Tr(g^4)Tr(h^{2p^m+2}) + Tr(g^{2p^m+2})Tr(h^4) +$$
$$2Tr(g^{2p^m+2})Tr(h^{p^m+3}) + 2Tr(g^{p^m+3})Tr(h^{2p^m+2}) +$$
$$2Tr(g^{p^m+3})Tr(h^{3p^m+1}) + 2Tr(g^{3p^m+1})Tr(h^{p^m+3}) +$$
$$2Tr(g^{2p^m+2})Tr(h^{3p^m+1}) + 2Tr(g^{3p^m+1})Tr(h^{2p^m+2}) + Tr(g)Tr(h^5) +$$
$$Tr(g^6)Tr(h) + 2Tr(g)Tr(h^{p^m+4}) + 2Tr(g^{p^m+4})Tr(h) +$$
$$Tr(g)Tr(h^{2p^m+3}) + Tr(g^{2p^m+3})Tr(h) + Tr(g)Tr(h^{3p^m+2}) +$$
$$Tr(g^{3p^m+2})Tr(h) + 2Tr(g)Tr(h^{4p^m+1}) + 2Tr(g^{4p^m+1})Tr(h) +$$
$$Tr(g^2)Tr(h^5) + Tr(g^5)Tr(h^2) + 2Tr(g^2)Tr(h^{p^m+6}) +$$
$$2Tr(g^{p^m+4})Tr(h^2) + Tr(g^2)Tr(h^{4p^m+1}) + 2Tr(g^{4p^m+1})Tr(h^2) +$$
$$2Tr(g^{p^m+1})Tr(h^5) + 2Tr(g^5)Tr(h^{p^m+1}) + 2Tr(g^{p^m+1})Tr(h^{p^m+4}) +$$
$$2Tr(g^{p^m+4})Tr(h^{p^m+1}) + Tr(g^{p^m+1})Tr(h^{2p^m+3}) +$$
$$Tr(g^{2p^m+3})Tr(h^{p^m+1}) + Tr(g^{p^m+1})Tr(h^{3p^m+2}) +$$
$$Tr(g^{3p^m+2})Tr(h^{p^m+3}) + 2Tr(g^{p^m+1})Tr(h^{4p^m+1}) +$$
$$2Tr(g^{4p^m+1})Tr(h^{p^m+1}) + Tr(g^3)Tr(h^{2p^m+3}) + Tr(g^{2p^m+3})Tr(h^3) +$$
$$Tr(g^3)Tr(h^{3p^m+2}) + Tr(g^{3p^m+2})Tr(h^3) + Tr(g^{p^m+2})Tr(h^{p^m+4}) +$$
$$Tr(g^{p^m+4})Tr(h^{p^m+2}) + 2Tr(g^{p^m+2})Tr(h^{2p^m+2}) +$$
$$2Tr(g^{3p^m+2})Tr(h^{p^m+2}) + Tr(g^{p^m+2})Tr(h^{4p^m+1}) +$$
$$Tr(g^{4p^m+1})Tr(h^{p^m+2}) + Tr(g^{2p^m+1})Tr(h^{p^m+4}) +$$
$$Tr(g^{p^m+4})Tr(h^{2p^m+1}) + 2Tr(g^{2p^m+1})Tr(h^{2p^m+3}) +$$
$$2Tr(g^{2p^m+3})Tr(h^{2p^m+2}) + Tr(g^{2p^m+2})Tr(h^{4p^m+1}) +$$
$$Tr(g^{4p^m+2})Tr(h^{2p^m+1}) + Tr(g)Tr(h^{p^m+6}) + Tr(g^{p^m+5})Tr(h) +$$
$$Tr(g)Tr(h^{2p^m+4}) + Tr(g^{2p^m+4})Tr(h) + 2Tr(g)Tr(h^{3p^m+3}) +$$
$$2Tr(g^{3p^m+3})Tr(h) + Tr(g)Tr(h^{4p^m+2}) + Tr(g^{4p^m+2})Tr(h) +$$
$$Tr(g)Tr(h^{5p^m+1}) + Tr(g^{5p^m+1})Tr(h) + Tr(g^2)Tr(h^{3p^m+3}) +$$
$$Tr(g^{3p^m+3})Tr(h^2) + Tr(g^{p^m+1})Tr(h^{p^m+4}) + Tr(g^{2p^m+4})Tr(h^{p^m+1}) +$$
$$Tr(g^{p^m+1})Tr(h^{4p^m+2}) + Tr(g^{4p^m+2})Tr(h^{p^m+1}) + 2Tr(g^3) +$$
$$Tr(g^6) + 2Tr(g^{3p^m+3}) + 2Tr(h^3) + Tr(h^6) + 2Tr(h^{3p^m+2})$$

Here, $Tr(g^2) = Tr(g)^2 + Tr(g^{p^m-1}) + Tr(g)$ and $Tr(g^{p^m+1}) = Tr(g)^{\sqrt{p^{m+1}}}$. Accordingly, $Tr(g^2)$ is calculated from the trace $Tr(g)$ only. $Tr(h^2)$ is also calculated similarly.

As for a cubic term, the sum and the product of $Tr(g^{p^m+2})$ and $Tr(g^{2p^m+1})$ are expressed in Equation (13) below.

$$Tr(g^{p^m+2}) + Tr(g^{2p^m+1}) = Tr(g)Tr(g)^{\sqrt{3p^m}} + Tr(g^2) + Tr(g) \quad (13)$$
$$Tr(g^{p^m+2})Tr(g^{2p^m+1}) = Tr(g)^{3\sqrt{3p^m}} +$$
$$Tr(g^5) + Tr(g^2)^{\sqrt{3p^m}} + Tr(g^4) + Tr(g)^{\sqrt{3p^m}} + Tr(g)$$

$Tr(g^{p^m+2})$ and $Tr(g^{2p^m+1})$ are calculated from the trace $Tr(g)$ only. The reason is that a recurrence equation of the trace obtained by the characteristic polynomial yields $$Tr(g^5) = Tr(g)Tr(g^4) - \{Tr(g^{p^m+1}) + Tr(g)\}\{Tr(g)^3 + Tr(g)\} + \{Tr(g^2)Tr(g) - 1\}Tr(g^2).$$

$Tr(h^{p^m+2})$ and $Tr(h^{2p^m+1})$ are calculated similarly.

As for a quartic term, the sum and the product of $Tr(g^{p^m+3})$ and $Tr(g^{3p^m+1})$ are expressed in Equation (14) below.

$$Tr(g^{p^m+3}) + Tr(g^{3p^m+1}) = \quad (14)$$
$$Tr(g) + Tr(g^2)Tr(g)^{\sqrt{3p^m}} - Tr(g^{p^m+2}) - Tr(g^{2p^m+1})$$
$$Tr(g^{p^m+3})Tr(g^{3p^m+1}) =$$
$$Tr(g^4)^{\sqrt{3p^m}} + Tr(g^7) + Tr(g)^{3\sqrt{3p^m}} + Tr(g^5) + Tr(g)^{\sqrt{3p^m}} + Tr(g^2)$$

$Tr(g^{p^m+3})$ and $Tr(g^{2p^m+1})$ are calculated from the trace $Tr(g)$ only. The reason is that a recurrence equation of the trace obtained by the characteristic polynomial yields $$Tr(g^7) = Tr(g)\{Tr(g^6) + Tr(g^2)\} - \{Tr(g^{p^m+1}) + Tr(g)\} \{Tr(g)^5 + Tr(g)^3\} + \{Tr(g^2)Tr(g) - 1\}Tr(g^4)Tr(g)$$

$Tr(h^{p^m+1})$ and $Tr(h^{3p^m+1})$ are calculated similarly.

As for a quintic term, the sum and the product of $Tr(g^{p^m+4})$ and $Tr(g^{4p^m+1})$, and, the sum and the product of $Tr(g^{2p^m+3})$ and $Tr(g^{3p^m+2})$ are expressed in Equation (15) below.

$$Tr(g^{p^m+4}) + Tr(g^{4p^m+1}) = \quad (15)$$
$$Tr(g)^{\sqrt{3p^m}} + Tr(g^2)^{\sqrt{3p^m}} + Tr(g)^3 Tr(g)^{\sqrt{3p^m}}$$
$$Tr(g^{p^m+4})Tr(g^{4p^m+1}) = Tr(g^5)^{\sqrt{3p^m}} + Tr(g)^9 +$$
$$Tr(g^4)^{\sqrt{3p^m}} + Tr(g^2)^3 + Tr(g)^3 + Tr(g)^{\sqrt{3p^m}}$$
$$Tr(g^{2p^m+3})Tr(g^{3p^m+2}) = -Tr(g^{p^m+3}) - Tr(g^{3p^m+1}) -$$
$$Tr(g^{p^m+2}) - Tr(g^{2p^m+1}) + Tr(g)Tr(g^2)^{\sqrt{3p^m}}$$
$$Tr(g^{2p^m+2})Tr(g^{2p^m+2}) = Tr(g^5)^{\sqrt{3p^m}} + Tr(g^6) +$$
$$Tr(g^7) + Tr(g)^{3\sqrt{3p^m}} + Tr(g^2)^{\sqrt{2p^m}} + Tr(g)$$

$Tr(g^{p^m+4})$ and $Tr(g^{4p^m+1})$, and, $Tr(g^{2p^m+3})$ and $Tr(g^{3p^m+2})$ are calculated from the trace $Tr(g)$ only. $Tr(h^{p^m+4})$ and $Tr(h^{4p^m+1})$, and, $Tr(h^{2p^m+3})$ and $Tr(h^{3p^m+2})$ are calculated similarly.

As for a sextic term, the sum and the product of $Tr(g^{p^m+5})$ and $Tr(g^{5p^m+1})$ are expressed in Equation (16) below.

$$Tr(g^{p^m+5}) + Tr(g^{5p^m+1}) = -Tr(g^{p^m+2}) - Tr(g^{2p^m+1}) - \quad (16)$$
$$Tr(g^{2p^m+3}) - Tr(g^{3p^m+2}) + Tr(g^4)Tr(g)^{\sqrt{3p^m}}$$
$$Tr(g^{p^m+5})Tr(g^{5p^m+1}) = Tr(g^2)^{3\sqrt{3p^m}} + Tr(g^{11}) +$$
$$Tr(g^5)^{\sqrt{3p^m}} + Tr(g^7) + Tr(g^4) + Tr(g)^{\sqrt{3p^m}}$$

$Tr(g^{p^m+5})$ and $Tr(g^{p^m+1})$ are calculated from the trace $Tr(g)$ only. The reason is that a recurrence equation of the trace obtained, by the characteristic polynomial yields $$Tr(g^{11}) = Tr(g)\{Tr(g^{10}) + Tr(g^2)^3\} - \{Tr(g^{p^m+1}) + Tr(g)\}$$
$$\{Tr(g)^9 + Tr(g)^7\} + \{Tr(g^2)Tr(g) - 1\}Tr(g^8)Tr(g^5)$$

$Tr(h^{p^m 5})$ and $Tr(h^{5p^m+1})$ are calculated similarly.

The description above illustrates that the trace multiplication is possible. The procedure described above is summarized below.

The receiving unit 101 receives the trace $Tr(g)$ and its additional data, and the trace $Tr(h)$ and its additional data, as input. The coefficient calculating unit 102 calculates the coefficients $d_1(g, h) = Tr(g)Tr(h)$, $d_2(g, h)$, ..., and $d_n(g, h)$ of the polynomial that has a root that is a possible value of the multiplication value, from, the trace $Tr(g)$ and $Tr(h)$. The solving unit 103 obtains a root of the above-described polynomial. The selecting unit 104 uses the additional data for the trace $Tr(g)$ and the additional data for the trace $Tr(h)$ in order to select one multiplication value from the n obtained roots. The determining unit 105 uses the additional data for the trace $Tr(g)$ and the additional data for the trace $Tr(h)$ to determine the additional data for the multiplication value.

Various methods may be employed to determine the additional data. The simplest example is a method to allocate the value of the additional data in ascending order or descending order, like 0, 1, 2, and n−1, depending on the magnitude relationship of conjugates in the extension field representation or the projective representation.

Among the conjugates in the extension field representation or the projective representation, let the smallest element be the basic element. This basic element raised to the poser of $\{p^m\}^i$ may be the value of the additional data. In other case of the characteristic p=2, 3, the value of the additional data may be determined using values of $\{0, 1\}$ or $\{0, 1, 2\}$ of any element in the normal basis. The reason is that a quadratic equation and a cubic equation can be respectively solved by simple substitution of any element in the normal basis.

A quartic equation, which is a product of two quadratics, can be solved by solving a quadratic equation twice to obtain the solution. A sextic equation, which is a product of two cubics or a product of three quadratics, can be solved by solving a quadratic equation once and solving a cubic equation once to obtain the solution in any case.

Next, an example of selecting the multiplication value by the selecting unit 104 and determining the additional data for the multiplication value by the determining unit 105 will be described. First, the case of n=2 will be described.

If n=2, then the characteristic polynomial with respect to the element g of the algebraic torus $T_n(F_{p^m})$ is expressed as follows.

$$X^2 - Tr(g)X + 1$$

When the characteristic polynomial is equal to zero, and solving with respect to X, the extension field representation is expressed in Equation (17) below, using the trace and the additional data.

$$g, g^{p^*} = (Tr(g), \pm) = \frac{Tr(g)}{2} \pm \sqrt{\frac{Tr(g)^2}{4} - 1} \quad (17)$$

The results of multiplication after expansion are expressed in Equation (18) and Equation (19) below. It is necessary to note the double-sign correspondence.

$$(Tr(g), \pm)(Tr(h), \pm) = \quad (18)$$
$$\frac{Tr(g)}{2}\frac{Tr(h)}{2} \pm \frac{Tr(g)}{2}\sqrt{\frac{Tr(h)^2}{4}-1} \pm \frac{Tr(h)}{2}\sqrt{\frac{Tr(g)^2}{4}-1} + \sqrt{\frac{Tr(g)^2}{4}-1}\sqrt{\frac{Tr(h)^2}{4}-1}$$

$$(Tr(g), \pm)(Tr(h), \mp) = \quad (19)$$
$$\frac{Tr(g)}{2}\frac{Tr(h)}{2} \mp \frac{Tr(g)}{2}\sqrt{\frac{Tr(h)^2}{4}-1} \pm \frac{Tr(h)}{2}\sqrt{\frac{Tr(g)^2}{4}-1} - \sqrt{\frac{Tr(g)^2}{4}-1}\sqrt{\frac{Tr(h)^2}{4}-1}$$

The traces are expressed in Equation (20) and Equation (21) below.

$$Tr((Tr(g), \pm)(Tr(h), \pm)) = \quad (20)$$
$$2\left[\frac{Tr(g)}{2}\frac{Tr(h)}{2} + \sqrt{\frac{Tr(g)^2}{4}-1}\sqrt{\frac{Tr(h)^2}{4}-1}\right]$$

$$Tr((Tr(g), \pm)(Tr(h), \mp)) = \quad (21)$$
$$2\left[\frac{Tr(g)}{2}\frac{Tr(h)}{2} - \sqrt{\frac{Tr(g)^2}{4}-1}\sqrt{\frac{Tr(h)^2}{4}-1}\right]$$

When the polynomial is equal to zero, solving this equation where its root is a possible value of the multiplication value with respect to Y yields Equation (22) below.

$$Tr(gh), Tr(g^{p^*}h) = 2\left[\frac{Tr(g)}{2}\frac{Tr(h)}{2} \pm \sqrt{\frac{Tr(g)^2}{4}-1}\sqrt{\frac{Tr(h)^2}{4}-1}\right] \quad (22)$$

Accordingly, the selecting unit 104 simply selects a multiplication value with "+" in the case where the additional data for the trace Tr(g) and the additional data for the trace Tr(h) have the same sign, and selects a multiplication value with "−" in the case where the signs are different.

As for the additional data for the multiplication value, the extension field representation is expressed in Equation (23) below, using the trace and the additional data.

$$gh, g^{p^m}h^{p^m} = (Tr(gh), \pm) = \frac{Tr(gh)}{2} \pm \sqrt{\frac{Tr(gh)^2}{4}-1} \quad (23)$$

In the case where it is assumed to be Tr(gh)=Tr((Tr(g), ±)(Tr(h), ±)), the extension field representation is expressed in Equation (24) below.

$$(Tr(gh), \pm) = \frac{Tr(g)}{2}\frac{Tr(h)}{2} + \sqrt{\frac{Tr(g)^2}{4}-1}\sqrt{\frac{Tr(h)^2}{4}-1} \pm \quad (24)$$

$$\sqrt{\frac{Tr(g)^2}{4}\left\{\frac{Tr(h)^2}{4}-1\right\} + 2\frac{Tr(g)}{2}\frac{Tr(h)}{2}\sqrt{\frac{Tr(g)^2}{4}-1}\sqrt{\frac{Tr(h)^2}{4}-1} + \frac{Tr(h)^2}{4}\left\{\frac{Tr(g)^2}{4}-1\right\}} =$$

$$\frac{Tr(g)}{2}\frac{Tr(h)}{2} + \sqrt{\frac{Tr(g)^2}{4}-1}\sqrt{\frac{Tr(h)^2}{4}-1} \pm$$

$$\sqrt{\left\{\frac{Tr(g)}{2}\sqrt{\frac{Tr(h)^2}{4}-1} + \frac{Tr(h)}{2}\sqrt{\frac{Tr(g)^2}{4}-1}\right\}^2} = \frac{Tr(g)}{2}\frac{Tr(h)}{2} +$$

$$\sqrt{\frac{Tr(g)^2}{4}-1}\sqrt{\frac{Tr(h)^2}{4}-1} \pm \left\{\frac{Tr(g)}{2}\sqrt{\frac{Tr(h)^2}{4}-1} + \frac{Tr(h)}{2}\sqrt{\frac{Tr(g)^2}{4}-1}\right\}$$

The determining unit 105 simply determines the additional data for Tr(gh) as "+" in the case where both of the additional data for the trace Tr(g) and the additional data for the trace Tr(h) are "+", and determines that as "−" in the case where the both of them are "−". The other multiplication value is expressed in Equation (25) below.

$$(Tr(g^{p^m}h), \pm) = \frac{Tr(g)}{2}\frac{Tr(h)}{2} - \quad (25)$$

$$\sqrt{\frac{Tr(g)^2}{4}-1}\sqrt{\frac{Tr(h)^2}{4}-1} \pm \left\{\frac{Tr(g)}{2}\sqrt{\frac{Tr(h)^2}{4}-1} - \frac{Tr(h)}{2}\sqrt{\frac{Tr(g)^2}{4}-1}\right\}$$

Since the additional data for the trace Tr(g) and the additional data for the trace Tr(h) differ from each other, the determining unit 105 may simply determine the additional data for the trace Tr(h) as the additional data for Tr(gh).

In the course of the discussion above, it is important to clearly specify how to determine two square roots. For example, with respect to a specific number of 5, when an equation yet $\sqrt{5^2}=5$ holds, an equation $\sqrt{(-5)^2}=5$ should hold, and $\sqrt{(-5)^2}=-5$ should not hold. With, respect to an element of a finite field, when determining $\sqrt{\alpha^2}$, for example, the smaller one of α and −α is selected.

Next, the case of n=4 will be described. Solving the equation of "the characteristic polynomial for n=4 is equal to zero" with respect to X yields extension field representations of an element g and Frobenius conjugates of the element g, using the trace and the additional data. A quartic characteristic polynomial is factored into two quadratics. Then, these two quadratic equations are solved twice. Note that the formula for the solution is not available because the characteristic p=2.

The characteristic polynomial is factored into Equation (26) below. Here, the trace map $Tr_{4/2}$ is a map where π in the trace map Tr is replaced with $π^2$. The sum with respect to i in the map is i=0, 1, . . . , and n/2−1.

$$\{X^2 + Tr_{4/2}(g)X + 1\}\{X^2 + Tr_{4/2}(g)^{p^m}X + 1\} \quad (26)$$

With respect to the first term described above, change of variables with X=Tr$_{4/2}$(g)X' yields the equation expressed in Equation (27) below. The solutions of the equation expressed in Equation (27) are obtained with no calculation cost in a normal basis. These two solutions are bit inversions, which may be distinguished with one bit.

$$X'^2 + X' + \frac{1}{Tr_{4/2}(g)} = 0 \quad (27)$$

To solve the equation above, Tr$_{4/2}$(g) needs to be obtained in advance. An equation where the solutions are Tr$_{4/2}$(g) and Tr$_{4/2}$(g)$^{p^m}$ is expressed in Equation (28) below.

$$Z^2 + Tr(g)Z + Tr(g)^{\sqrt{2p^m}} = 0 \quad (28)$$

With respect to the equation above, change of variables with Z=Tr(g)Z' yields the equation expressed in Equation (29) below. The solutions of the equation expressed in Equation (29) are also obtained with no calculation cost in a normal basis. These two solutions are bit inversions, which may be distinguished with one bit.

$$Z'^2 + Z' + \frac{Tr(g)^{\sqrt{2p^m}}}{Tr(g)^2} = 0 \quad (29)$$

Accordingly, the extension field representations of the element g and the Frobenius conjugates of the element g are expressed in Equation (30) below.

$$g, g^{p^m}, g^{p^{2m}}, g^{p^{3m}} = (Tr(g), (i_1, i_2)) = \begin{pmatrix} i_2 \\ \vdots \end{pmatrix}\begin{pmatrix} i_1 \\ \vdots \end{pmatrix} Tr(g) \quad (30)$$

Here, the vector on the right side where the first component is $i_1$ expresses the solution of the above-described equation with respect to Z', and is the element of F$_{p^{2m}}$. The vector on the left side where the first component is $i_2$ expresses the solution of the above-described equation with respect to X', and is the element of F$_{p^{4m}}$. Each of $i_1$ and $i_2$ may be zero or one. Let ($i_1$, $i_2$)∈{0, 1}×{0, 1} be the additional data for Tr(g). The extension field representations of an element h and Frobenius conjugates of the element h are handled similarly.

The result of multiplication after expansion is expressed in Equation (31) below. Here, the notation for h is similar to the notation for g described above. Note that multiplication of an element of an extension field is commutative.

$$(Tr(g), (i_1, i_2))(Tr(h), (j_1, j_2)) = \begin{pmatrix} i_2 \\ \vdots \end{pmatrix}\begin{pmatrix} i_1 \\ \vdots \end{pmatrix}\begin{pmatrix} j_2 \\ \vdots \end{pmatrix}\begin{pmatrix} j_1 \\ \vdots \end{pmatrix} Tr(g)Tr(h) \quad (31)$$

When the polynomial is equal to zero, solving this equation where its root is a possible value of the multiplication value yields the possible value of the multiplication value. The quartic polynomial described above is then factored into two quadratics. These two quadratic equations are solved twice. Note that the equation for the solution is not available because the characteristic p=2. The polynomial described above is factored into Equation (32) below.

$$\begin{cases} Y^2 + \begin{pmatrix} Tr_{4/2}(g)Tr_{4/2}(h) + \\ Tr_{4/2}(g)^{p^m}Tr_{4/2}(h)^{p^m} \end{pmatrix} Y + \\ Tr(g)^2 + Tr(h)^2 + \\ \begin{pmatrix} Tr_{4/2}(g)Tr_{4/2}(h)^{p^m} + \\ Tr_{4/2}(g)^{p^m}Tr_{4/2}(h) \end{pmatrix}^{\sqrt{2p^m}} \end{cases} \quad (32)$$

$$\begin{cases} Y^2 + \begin{pmatrix} Tr_{4/2}(g)Tr_{4/2}(h)^{p^m} + \\ Tr_{4/2}(g)^{p^m}Tr_{4/2}(h) \end{pmatrix} Y + \\ Tr(g)^2 + Tr(h)^2 + \begin{pmatrix} Tr_{4/2}(g)Tr_{4/2}(h) + \\ Tr_{4/2}(g)^{p^m}Tr_{4/2}(h)^{p^m} \end{pmatrix}^{\sqrt{2p^m}} \end{cases}$$

To obtain the root of the above-described polynomial; Tr$_{4/2}$(g)Tr$_{4/2}$(h)+Tr$_{4/2}$(g)$^{p^m}$Tr$_{4/2}$(h)$^{p^m}$ and Tr$_{4/2}$(g)Tr$_{4/2}$(h)$^{p^m}$+ Tr$_{4/2}$(g)$^{p^m}$Tr$_{4/2}$(h) needs to be obtained in advance. An equation where these are the solutions is expressed in Equation (33) below.

$$W^2 + Tr(g)Tr(h)W + Tr(g)^2Tr(h)^{\sqrt{2p^m}} + Tr(g)^{\sqrt{2p^m}}Tr(h)^2 = 0 \quad (33)$$

With respect to the above-described equation, change of variables with W=Tr(g)Tr(h)W' yields the equation expressed in Equation (34) below. The solutions of the equation expressed in Equation (34) are also obtained with no calculation cost in a normal basis. These two solutions are bit inversions, which may be distinguished with one bit.

$$W'^2 + W' + \frac{Tr(g)^2Tr(h)^{\sqrt{2p^m}} + Tr(g)^{\sqrt{2p^m}}Tr(h)^2}{Tr(g)^2Tr(h)^2} = 0 \quad (34)$$

With respect to the first term of the above-described polynomial with respect to Y, change of variables with $$Y=(Tr_{4/2}(g)Tr_{4/2}(h)+Tr_{4/2}(g)^{p^m}Tr_{4/2}(h)^{p^m})Y'$$

yields the equation expressed in Equation (35) below. The solutions of the equation expressed in Equation (35) are also obtained with no calculation cost in a normal basis. These two solutions are bit inversions, which may be distinguished with one bit.

$$Y'^2 + Y' + \frac{Tr(g)^2Tr(h)^2 + (Tr_{4/2}(g) + Tr_{4/2}(h)^{p^m} + Tr_{4/2}(g)^{p^m}Tr_{4/2}(h))^{\sqrt{2p^m}}}{(Tr_{4/2}(g)Tr_{4/2}(h) + Tr_{4/2}(g)^{p^m}Tr_{4/2}(h)^{p^m})^2} = 0 \quad (35)$$

Accordingly, the possible value of the multiplication value is expressed in Equation (36) below.

$$Tr(gh), Tr(g^{p^m}h), Tr(g^{p^{2m}}h), \quad (36)$$
$$Tr(g^{p^{3m}}h) = \begin{pmatrix} l_2 \\ \vdots \end{pmatrix}\begin{pmatrix} l_1 \\ \vdots \end{pmatrix} Tr(g)Tr(h)$$

Here, the vector on the right side, which is represented by $l_1$, expresses the solution of the above-described equation with respect to W', and is the element of F$_{p^m}$. The vector on the left side, which is represented by $l_2$, expresses the solution of the above-described equation with respect to Y', and is the element of $F_{p^m}$. Each of $l_1$ and $l_2$ may be zero or one. In the case where a given $(l_1, l_2)$ expresses the multiplication value Tr(gh), the extension field representation of the multiplication value is expressed in Equation (37) below, using the multiplication value and the additional data.

$$(Tr(gh), (k_1, k_2)) = \begin{pmatrix} k_2 \\ \vdots \end{pmatrix}\begin{pmatrix} k_1 \\ \vdots \end{pmatrix}\begin{pmatrix} l_2 \\ \vdots \end{pmatrix}\begin{pmatrix} l_1 \\ \vdots \end{pmatrix} Tr(g)Tr(h) \quad (37)$$

Here, the vector that is represented by $k_2$ expresses the solution of the equation with respect to Z', and is the element of $F_{p^{2m}}$. The vector that is represented by $k_2$ expresses the solution of the equation with respect to X', and is the element of $F_{p^{4m}}$. Each of k1 and k2 may be zero or one. $(k_1, k_2) \in \{0, 1\} \times \{0, 1\}$ is the additional data for Tr(gh). The relation between an input of $(i_1, i_2, j_1, j_2)$ and an output of $(k_1, k_2, l_1, l_2)$ is expressed in Equation (38) below.

$$\frac{gh}{Tr_{4/2}(gh)} \frac{Tr_{4/2}(gh)}{Tr(gh)} \frac{Tr(gh)}{Tr_{4/2}(g)Tr_{4/2}(h) + Tr_{4/2}(g)^{p^m}Tr_{4/2}(h)^{p^m}} \quad (38)$$

$$\frac{Tr_{4/2}(g)Tr_{4/2}(h) + Tr_{4/2}(g)^{p^m}Tr_{4/2}(h)^{p^m}}{Tr(g)Tr(h)} =$$

$$\frac{g}{Tr_{4/2}(g)} \frac{Tr_{4/2}(g)}{Tr(g)} \frac{h}{Tr_{4/2}(h)} \frac{Tr_{4/2}(h)}{Tr(h)} \begin{pmatrix} k_2 \\ \vdots \end{pmatrix}\begin{pmatrix} k_1 \\ \vdots \end{pmatrix}\begin{pmatrix} l_2 \\ \vdots \end{pmatrix}\begin{pmatrix} l_1 \\ \vdots \end{pmatrix} =$$

$$\begin{pmatrix} i_2 \\ \vdots \end{pmatrix}\begin{pmatrix} i_1 \\ \vdots \end{pmatrix}\begin{pmatrix} j_2 \\ \vdots \end{pmatrix}\begin{pmatrix} j_1 \\ \vdots \end{pmatrix}$$

The solution of the equation with respect to W' is expressed in Equation (39) below, using $Tr_{4/2}(g)$ and $Tr_{4/2}(h)$. Here, the addition symbol (+) denotes addition of the element of the finite field.

$$\begin{pmatrix} l_1 \\ \vdots \end{pmatrix} = \begin{pmatrix} i_1 \\ \vdots \end{pmatrix}\begin{pmatrix} j_1 \\ \vdots \end{pmatrix} + \begin{pmatrix} \bar{i}_1 \\ \vdots \end{pmatrix}\begin{pmatrix} \bar{j}_1 \\ \vdots \end{pmatrix} \quad (39)$$

$$\begin{pmatrix} l_1 \\ \vdots \end{pmatrix} = \begin{pmatrix} i_1 \\ \vdots \end{pmatrix}\begin{pmatrix} \bar{j}_1 \\ \vdots \end{pmatrix} + \begin{pmatrix} \bar{i}_1 \\ \vdots \end{pmatrix}\begin{pmatrix} j_1 \\ \vdots \end{pmatrix}$$

The solution of the equation with respect to Y' is expressed in Equation (40) below, using g and h.

$$\begin{pmatrix} l_2 \\ \vdots \end{pmatrix}\begin{pmatrix} l_1 \\ \vdots \end{pmatrix} = \begin{pmatrix} i_2 \\ \vdots \end{pmatrix}\begin{pmatrix} i_1 \\ \vdots \end{pmatrix}\begin{pmatrix} j_2 \\ \vdots \end{pmatrix}\begin{pmatrix} j_1 \\ \vdots \end{pmatrix} + \begin{pmatrix} i_2 \\ \vdots \end{pmatrix}^{p^m}\begin{pmatrix} \bar{i}_1 \\ \vdots \end{pmatrix}\begin{pmatrix} j_2 \\ \vdots \end{pmatrix}^{p^m}\begin{pmatrix} \bar{j}_1 \\ \vdots \end{pmatrix} + \quad (40)$$

$$\begin{pmatrix} \bar{i}_2 \\ \vdots \end{pmatrix}\begin{pmatrix} i_1 \\ \vdots \end{pmatrix}\begin{pmatrix} \bar{j}_2 \\ \vdots \end{pmatrix}\begin{pmatrix} j_1 \\ \vdots \end{pmatrix} + \begin{pmatrix} \bar{i}_2 \\ \vdots \end{pmatrix}^{p^m}\begin{pmatrix} \bar{i}_1 \\ \vdots \end{pmatrix}\begin{pmatrix} \bar{j}_2 \\ \vdots \end{pmatrix}^{p^m}\begin{pmatrix} \bar{j}_1 \\ \vdots \end{pmatrix}$$

$Tr_{4/2}(gh)$ and $Tr_{4/2}(gh)^{p^m}$ are expressed in Equation (41) below, using g and h.

$$\begin{pmatrix} k_1 \\ \vdots \end{pmatrix}\begin{pmatrix} l_2 \\ \vdots \end{pmatrix}\begin{pmatrix} l_1 \\ \vdots \end{pmatrix} = \begin{pmatrix} i_2 \\ \vdots \end{pmatrix}\begin{pmatrix} i_1 \\ \vdots \end{pmatrix}\begin{pmatrix} j_2 \\ \vdots \end{pmatrix}\begin{pmatrix} j_1 \\ \vdots \end{pmatrix} + \begin{pmatrix} \bar{i}_2 \\ \vdots \end{pmatrix}\begin{pmatrix} i_1 \\ \vdots \end{pmatrix}\begin{pmatrix} \bar{j}_2 \\ \vdots \end{pmatrix}\begin{pmatrix} j_1 \\ \vdots \end{pmatrix} \quad (41)$$

-continued $$\begin{pmatrix} k_1 \\ \vdots \end{pmatrix}\begin{pmatrix} l_2 \\ \vdots \end{pmatrix}\begin{pmatrix} l_1 \\ \vdots \end{pmatrix} =$$

$$\begin{pmatrix} i_2 \\ \vdots \end{pmatrix}^{p^m}\begin{pmatrix} \bar{i}_1 \\ \vdots \end{pmatrix}\begin{pmatrix} j_2 \\ \vdots \end{pmatrix}^{p^m}\begin{pmatrix} \bar{j}_1 \\ \vdots \end{pmatrix} + \begin{pmatrix} \bar{i}_2 \\ \vdots \end{pmatrix}^{p^m}\begin{pmatrix} \bar{i}_1 \\ \vdots \end{pmatrix}\begin{pmatrix} \bar{j}_2 \\ \vdots \end{pmatrix}^{p^m}\begin{pmatrix} \bar{j}_1 \\ \vdots \end{pmatrix}$$

Accordingly, $k_2$, $k_1$, and $l_2$ are expressed in Equation (42) below.

$$\begin{pmatrix} k_2 \\ \vdots \end{pmatrix} = \frac{\begin{pmatrix} i_2 \\ \vdots \end{pmatrix}\begin{pmatrix} j_2 \\ \vdots \end{pmatrix}}{\begin{pmatrix} i_2 \\ \vdots \end{pmatrix}\begin{pmatrix} j_2 \\ \vdots \end{pmatrix} + \begin{pmatrix} \bar{i}_2 \\ \vdots \end{pmatrix}\begin{pmatrix} \bar{j}_2 \\ \vdots \end{pmatrix}} \quad (42)$$

$$\begin{pmatrix} k_1 \\ \vdots \end{pmatrix} = \frac{\left\{\begin{pmatrix} i_2 \\ \vdots \end{pmatrix}\begin{pmatrix} j_2 \\ \vdots \end{pmatrix} + \begin{pmatrix} \bar{i}_2 \\ \vdots \end{pmatrix}\begin{pmatrix} \bar{j}_2 \\ \vdots \end{pmatrix}\right\}\begin{pmatrix} i_1 \\ \vdots \end{pmatrix}\begin{pmatrix} j_1 \\ \vdots \end{pmatrix}}{\left\{\begin{pmatrix} i_2 \\ \vdots \end{pmatrix}\begin{pmatrix} j_2 \\ \vdots \end{pmatrix} + \begin{pmatrix} \bar{i}_2 \\ \vdots \end{pmatrix}\begin{pmatrix} \bar{j}_2 \\ \vdots \end{pmatrix}\right\}\begin{pmatrix} i_1 \\ \vdots \end{pmatrix}\begin{pmatrix} j_1 \\ \vdots \end{pmatrix} + \left\{\begin{pmatrix} i_2 \\ \vdots \end{pmatrix}^{p^m}\begin{pmatrix} j_2 \\ \vdots \end{pmatrix}^{p^m} + \begin{pmatrix} \bar{i}_2 \\ \vdots \end{pmatrix}^{p^m}\begin{pmatrix} \bar{j}_2 \\ \vdots \end{pmatrix}^{p^m}\right\}\begin{pmatrix} \bar{i}_1 \\ \vdots \end{pmatrix}\begin{pmatrix} \bar{j}_1 \\ \vdots \end{pmatrix}}$$

$$\begin{pmatrix} l_2 \\ \vdots \end{pmatrix} = \frac{\left\{\begin{pmatrix} i_2 \\ \vdots \end{pmatrix}\begin{pmatrix} j_2 \\ \vdots \end{pmatrix} + \begin{pmatrix} \bar{i}_2 \\ \vdots \end{pmatrix}\begin{pmatrix} \bar{j}_2 \\ \vdots \end{pmatrix}\right\}\begin{pmatrix} i_1 \\ \vdots \end{pmatrix}\begin{pmatrix} j_1 \\ \vdots \end{pmatrix} + \left\{\begin{pmatrix} i_2 \\ \vdots \end{pmatrix}^{p^m}\begin{pmatrix} j_2 \\ \vdots \end{pmatrix}^{p^m} + \begin{pmatrix} \bar{i}_2 \\ \vdots \end{pmatrix}^{p^m}\begin{pmatrix} \bar{j}_2 \\ \vdots \end{pmatrix}^{p^m}\right\}\begin{pmatrix} \bar{i}_1 \\ \vdots \end{pmatrix}\begin{pmatrix} \bar{j}_1 \\ \vdots \end{pmatrix}}{\begin{pmatrix} i_1 \\ \vdots \end{pmatrix}\begin{pmatrix} j_1 \\ \vdots \end{pmatrix} + \begin{pmatrix} \bar{i}_1 \\ \vdots \end{pmatrix}\begin{pmatrix} \bar{j}_1 \\ \vdots \end{pmatrix}}$$

Next, the case of n=6 will be described. In the case of n=6, when the characteristic polynomial is equal to 0, solving it with respect to X yields extension field representations of an element g and Frobenius conjugates elements of the element g, using the trace and the additional data. A sextic characteristic polynomial is factored into three quadratics. Then the quadratic equation is solved once, and then the cubic equation is solved once. Note that the cubic formula is not available because the characteristic p=3. The characteristic polynomial is factored as shown in Equation (43) below.

$$\{X^2 - Tr_{6/3}(g)X + 1\}\{X^2 - Tr_{6/3}(g)^{p^m}X + 1\} \{X^2 - Tr_{6/3}(g)^{p^{2m}}X + 1\} \quad (43)$$

Solving $x^2 - Tr_{6/3}(g)X - 1 = 0$ with respect to X yields the solution expressed in Equation (44) below.

$$X = -Tr_{6/3}(g) \pm \sqrt{Tr_{6/3}(g)^2 - 1} \quad (44)$$

To calculate X, which is described above, $Tr_{6/3}(g)$ needs to be obtained in advance. An equation where the solutions are $Tr_{6/3}(g)$, $Tr_{6/3}(g)^{p^m}$, and $Tr_{6/3}(g)^{p^{2m}}$ is expressed in Equation (45) below.

$$Z^3 - Tr(g)Z^2 + \{Tr(g)^{\sqrt{2p^m}} + Tr(g)\}Z - \{Tr(g^2) - 1\} = 0 \quad (45)$$

With respect to the equation described above, change of variables with $$Z = -\sqrt{Tr(g)^5 - TR(g)^{2\sqrt{3p^m}+2} - Tr(g)^{3+\sqrt{3p^m}} + Tr(g)^{3\sqrt{3p^m}}} \bigg/ Tr(g)^{2Z'} - \{Tr(g)^{\sqrt{3p^m}} + Tr(g)\}/Tr(g)$$

yields the equation expressed in Equation (46) below. The solutions of the equation expressed in Equation (46) are also obtained with no calculation cost in a normal basis. The three solutions are expressed such that zero is replaced with one, one is replaced with two, and two is replaced with zero, one another. Thus, the three solutions are distinguished with $\{0, 1, 2\}$.

$$Z'^3 + Z' + \frac{\sqrt{Tr(g)^5 - Tr(g)^{2\sqrt{3p^m}+2} - Tr(g)^{3+\sqrt{3p^m}} + Tr(g)^{3\sqrt{3p^m}}}}{Tr(g)^3} = 0 \quad (46)$$

The extension field representations of $Tr_{6/3}(g)$, $Tr_{6/3}(g)^{p^m}$, and $Tr_{6/3}(g)^{p^{2m}}$ are expressed in Equation (47) below.

$$Tr_{6/3}(g), Tr_{6/3}(g)^{p^m}, Tr_{6/3}(g)^{p^{2m}} = \quad (47)$$

$$-\frac{\sqrt{\begin{array}{c}Tr(g)^5 - Tr(g)^{2\sqrt{3p^m}+2} - \\ \sqrt{Tr(g)^{3+\sqrt{3p^m}} + Tr(g)^{3\sqrt{3p^m}}}\end{array}}}{\begin{pmatrix}i_1\\\vdots\end{pmatrix}Tr(g)^2} - \frac{Tr(g)^{\sqrt{3p^m}} + Tr(g)}{Tr(g)}$$

Here, the vector that is represented by $i_1$ expresses the solution of the above-described equation with respect to $Z'$, and is the element of $F_{p^{3m}}$. The extension field representations of $g$ and $g^{p^{3m}}$ are expressed in Equation (48) below.

$$g, g^{p^{3m}} = -Tr_{6/3}(g) \pm \sqrt{Tr_{6/3}(g)^2 - 1} \quad (48)$$

Accordingly, the extension field representations of the element $g$ and the Frobenius conjugates of the element $g$ are expressed in Equation (49) below.

$$g, g^{p^m}, g^{p^{2m}}, g^{p^{3m}}, g^{p^{4m}}, g^{p^{5m}} = (Tr(g), (i_1, \pm)) = \quad (49)$$

$$-\frac{\sqrt{\begin{array}{c}Tr(g)^5 - Tr(g)^{2\sqrt{3p^m}+2} - \\ \sqrt{Tr(g)^{3+\sqrt{3p^m}} + Tr(g)^{3\sqrt{3p^m}}}\end{array}}}{\begin{pmatrix}i_1\\\vdots\end{pmatrix}Tr(g)^2} + \frac{Tr(g)^{\sqrt{3p^m}} + Tr(g)}{Tr(g)} \pm$$

$$\sqrt{\left\{\frac{\sqrt{Tr(g)^5 - Tr(g)^{2\sqrt{3p^m}+2} - } \atop \sqrt{Tr(g)^{3+\sqrt{3p^m}} + Tr(g)^{3\sqrt{3p^m}}}}{\begin{pmatrix}i_1\\\vdots\end{pmatrix}Tr(g)^2} + \frac{Tr(g)^{\sqrt{3p^m}} + Tr(g)}{Tr(g)}\right\}^2 - 1}$$

The solution of the above-described equation with respect to X is the element of $F_{p^{6m}}$, and distinguished with "$\pm$". $i_1$ may be zero, one, or two. Let $(i_1, i_2) \in \{0, 1, 2\} \times \{+, -\}$ be the additional data for $Tr(g)$. The extension field representations of the element $h$ and the Frobenius conjugates of the element $h$ are handled similarly.

Assume that $i_1$ expresses $Tr_{6/3}(g)$, and $j_1$ expresses $Tr_{6/3}(h)$, the results of multiplication after expansion are expressed in Equation (50) below. It is necessary to note the double-sign correspondence.

$$(Tr(g), (i_1, \pm))(Tr(h), (j_1, \pm)) = \quad (50)$$
$$Tr_{6/3}(g)Tr_{6/3}(h) \mp Tr_{6/3}(g)\sqrt{Tr_{6/3}(h)^2 - 1} \mp$$
$$Tr_{6/3}(h)\sqrt{Tr_{6/3}(g)^2 - 1} + \sqrt{Tr_{6/3}(g)^2 - 1}\sqrt{Tr_{6/3}(h)^2 - 1}$$
$$(Tr(g), (i_1, \pm))(Tr(h), (j_1, \mp)) =$$
$$Tr_{6/3}(g)Tr_{6/3}(h) \pm Tr_{6/3}(g)\sqrt{Tr_{6/3}(h)^2 - 1} \pm$$
$$Tr_{6/3}(h)\sqrt{Tr_{6/3}(g)^2 - 1} - \sqrt{Tr_{6/3}(g)^2 - 1}\sqrt{Tr_{6/3}(h)^2 - 1}$$

When the polynomial is equal to zero, solving this equation where its root is a possible value of the multiplication value yields the possible value of the multiplication value. A sextic polynomial above is factored into three quadratics. The quadratic equation is solved once and then the cubic equation is solved once. Note that the cubic formula is not available because the characteristic p=3. The polynomial above is factored into Equation (51) to Equation (53) below.

$$\{Y - Tr(gh)\}\{Y - Tr(g^{p^{3m}}h)\} = \quad (51)$$
$$Y^2 - Tr_{3/1}[Tr_{6/3}(g)Tr_{6/3}(h)]Y + Tr(g^2) + Tr(h^2) +$$
$$Tr_{3/1}[Tr_{6/3}(g)Tr_{6/3}(h)^{p^m\sqrt{3p^m}}] + Tr_{3/1}[Tr_{6/3}(g)^{p^m\sqrt{3p^m}}Tr_{6/3}(h)]$$

$$\{Y - Tr(g^{p^m}h)\}\{Y - Tr(g^{p^{4m}}h)\} = \quad (52)$$
$$Y^2 - Tr_{3/1}[Tr_{6/3}(g)Tr_{6/3}(h)^{p^{2m}}]Y + Tr(g^2) + Tr(h^2) +$$
$$Tr_{3/1}[Tr_{6/3}(g)Tr_{6/3}(h)^{\sqrt{3p^m}}] + Tr_{3/1}[Tr_{6/3}(g)^{p^{2m}\sqrt{3p^m}}Tr_{6/3}(h)]$$

$$\{Y - Tr(g^{p^{2m}}h)\}\{Y - Tr(g^{p^{5m}}h)\} = \quad (53)$$
$$Y^2 - Tr_{3/1}[Tr_{6/3}(g)Tr_{6/3}(h)^{p^m}]Y + Tr(g^2) + Tr(h^2) +$$
$$Tr_{3/1}[Tr_{6/3}(g)Tr_{6/3}(h)^{p^{2m}\sqrt{3p^m}}] + Tr_{3/1}[Tr_{6/3}(g)^{\sqrt{3p^m}}Tr_{6/3}(h)]$$

Here, this may be expressed in, for example, Equation (54).

$$Tr_{3/1}\lfloor Tr_{6/3}(g)Tr_{6/3}(h)^{p^{2m}\sqrt{3p^m}}\rfloor + Tr_{3/1}\lfloor Tr_{6/3}(g)^{\sqrt{3p^m}}Tr_{6/3}(h)\rfloor = \quad (54)$$
$$Tr_{3/1}[Tr_{6/3}(g)Tr_{6/3}(h)^{p^m}]^{\sqrt{3p^m}} +$$
$$Tr(g)^{\sqrt{3p^m}} + Tr(h)^{\sqrt{3p^m}} + Tr(g) + Tr(h)$$

Namely, in the case where the polynomial that has a root that is a possible value of the multiplication value is factored into three quadratics, $Tr_{3/1}[Tr_{6/3}(g)Tr_{6/3}(h)]$, $Tr_{3/1}[Tr_{6/3}(g)Tr_{6/3}(h)^{p^m}]$, and $Tr_{3/1}[Tr_{6/3}(g)Tr_{6/3}(h)^{p^{2m}}]$ need to be obtained in advance, in order to obtain the root. The equations that have these solutions are expressed in Equation (55) and Equation (56).

$$W^3 - Tr(g)Tr(h)W^2 + \quad (55)$$
$$\{Tr(g)^{\sqrt{3p^m}}Tr(h)^{\sqrt{3p^m}} + Tr(g^2)Tr(h)^{\sqrt{3p^m}} + Tr(g)^{\sqrt{3p^m}}Tr(h^2) +$$
$$Tr(g^2)Tr(h) + Tr(g)Tr(h^2) + Tr(g)Tr(h)^{\sqrt{3p^m}} +$$
$$Tr(g)^{\sqrt{3p^m}}Tr(h) + Tr(g)Tr(h)\}W + c = 0$$

-continued $$c = -\{Tr(g^{2+p^m})Tr(h^{2+p^m}) + Tr(g^{2p^m+1})Tr(h^{2p^m+1}) - Tr(g)^3 - Tr(h)^3 + \\ Tr(g^{2+p^m})Tr(h)^{\sqrt{3p^m}} + Tr(g)^{\sqrt{3p^m}} Tr(h^{2+p^m}) + \\ Tr(g^{2+p^m+1})Tr(h)^{\sqrt{3p^m}} + Tr(g)^{\sqrt{3p^m}} Tr(h^{2p^m+1}) + \\ Tr(g)^3 Tr(h^2) + Tr(g^2)Tr(h)^3 - Tr(g^{2+p^m})Tr(h) - \\ Tr(g)Tr(h^{2+p^m}) - Tr(g^{2p^m+1})Tr(h) - \\ Tr(g)Tr(h^{2p^m+1}) - Tr(g)^{\sqrt{3p^m}} Tr(h)^{\sqrt{3p^m}} + \\ Tr(g)^{\sqrt{3p^m}} Tr(h) + Tr(g)Tr(h)^{\sqrt{3p^m}} - Tr(g)Tr(h)\}$$ (56)

As described above, the sum and the product of $Tr(g^{p^m+2})$ and $Tr(g^{2p^m+1})$ may be calculated from $Tr(g)$. Namely, they may be obtained by calculating the solution of the quadratic equation expressed in Equation (57) below.

$$V^2 - \{Tr(g)Tr(g)^{\sqrt{3p^m}} + Tr(g^2) + Tr(g)\}V + Tr(g)^{3\sqrt{3p^m}} + \\ Tr(g^5) + Tr(g^2)^{\sqrt{3p^m}} + Tr(g^4) + Tr(g)^{\sqrt{3p^m}} + Tr(g) = 0$$ (57)

$Tr(h^{p^m+2})$ and $Tr(h^{2p^m+1})$ may be handled similarly. Change of variables in the cubic equation with respect to W is made such that the solution is obtained with no calculation cost in a normal basis. With respect to W, let b be the linear coefficient. Change of variables with $W = -\sqrt{\bullet}/\{Tr(g)^2Tr(h)^{2W'}\} - b/\{Tr(g)Tr(h)\}$ yields the equation expressed in Equation (58) below. The three solutions are expressed such that, zero is replaced with one, one is replaced with two, and two is replaced with zero, one another. Thus, the three solutions are distinguished with $\{0, 1, 2\}$.

$$W'^3 + W' + \frac{\sqrt{\bullet}}{Tr(g)^3 Tr(h)^3} = 0$$ (58)

$$\bullet = b^3 - Trg)^2 Tr(h)^2 b^2 - Tr(g)^3 Tr(h)^3 c$$

The extension field representations of $$Tr_{3/1}[Tr_{6/3}(g)Tr_{6/3}(h)], Tr_{3/1}[Tr_{6/3}(g)Tr_{6/3}(h)^{p^m}],$$ (59)

and $Tr_{3/1}[Tr_{6/3}(g)Tr_{6/3}(h)^{p^{2m}}]$ are expressed in Equation (59) below.

$$Tr_{3/1}[Tr_{6/3}(g) Tr_{6/3}(h)], Tr_{3/1}[Tr_{6/3}(g) Tr_{6/3}(h)^{p^m}],$$

$$Tr_{3/1}\lfloor Tr_{6/3}(g) Tr_{6/3}(h)^{p^{2m}}\rfloor = -\frac{\sqrt{\bullet}}{\begin{pmatrix}l_1\\\vdots\end{pmatrix}Tr(g)^2Tr(h)^2} - \frac{b}{Tr(g)Tr(h)}$$

Here, the vector that is represented by $l_1$ expresses the solution of the above-described equation with respect to W', and is the element of $F_{p^{3m}}$. The possible values of the multiplication values $Tr(gh)$ and $Tr(g^{3^m}h)$ are expressed in Equation (60) below.

$$Tr(gh), Tr(g^{p^{3m}}h) = \\ -Tr_{3/1}[Tr_{6/3}(g) Tr_{6/3}(h)] \pm \sqrt{\begin{array}{c}Tr_{3/1}[Tr_{6/3}(g) Tr_{6/3}(h)]^2 - \\ Tr_{3/1}[Tr_{6/3}(g) Tr_{6/3}(h)]^{\sqrt{3p^m}} - \\ Tr(g)^2 - Tr(h)^2\end{array}}$$ (60)

Accordingly, the possible value of the multiplication value is expressed in Equation (61) below.

$$Tr(gh), Tr(g^{p^m}h), Tr(g^{p^{2m}}h), Tr(g^{p^{3m}}h), Tr(g^{p^{4m}}h),$$ (61)

$$Tr(g^{p^{5m}}h) = -\frac{\sqrt{\bullet}}{\begin{pmatrix}l_1\\\vdots\end{pmatrix}Tr(g)^2Tr(h)^2} + \frac{b}{Tr(g)Tr(h)} +$$

$$l_2 \sqrt{\begin{array}{c}\left\{\frac{\sqrt{\bullet}}{\begin{pmatrix}l_1\\\vdots\end{pmatrix}Tr(g)^2Tr(h)^2} + \frac{b}{Tr(g)Tr(h)}\right\}^2 + \\ \left\{\frac{\sqrt{\bullet}}{\begin{pmatrix}l_1\\\vdots\end{pmatrix}Tr(g)^2Tr(h)^2} + \frac{b}{Tr(g)Tr(h)}\right\}^{\sqrt{3p^m}} - Tr(g)^2 - Tr(h)^2\end{array}}$$

In the case where a given $(l_1, l_2)$ expresses the multiplication value $Tr(gh)$, the extension field representation of the multiplication value is expressed in Equation (62) below, using the multiplication value and the additional data.

$$(Tr(gh), (k_1, k_2)) = \\ \frac{\sqrt{\begin{array}{c}Tr(gh)^5 - Tr(gh)^{2\sqrt{3p^m}+2} - \\ Tr(gh)^{3+\sqrt{3p^m}} + Tr(gh)^{3\sqrt{3p^m}}\end{array}}}{\begin{pmatrix}k_1\\\vdots\end{pmatrix}Tr(gh)^2} + \frac{Tr(gh)^{\sqrt{3p^m}} + Tr(gh)}{Tr(gh)} + k_2$$ (62)

$$\sqrt{\left\{\frac{\sqrt{\begin{array}{c}Tr(gh)^5 - Tr(gh)^{2\sqrt{3p^m}+2} - \\ Tr(gh)^{3+\sqrt{3p^m}} + Tr(gh)^{3\sqrt{3p^m}}\end{array}}}{\begin{pmatrix}k_1\\\vdots\end{pmatrix}Tr(gh)^2} + \frac{Tr(gh)^{\sqrt{3p^m}} + Tr(gh)}{Tr(gh)}\right\}^2 - 1}$$

On the other hand, the input is expressed in Equation (63) below.

$$(Tr(g), (i_1, i_2))(Tr(h), (j_1, j_2)) = \qquad (63)$$

$$\left[ \frac{\sqrt{\frac{Tr(g)^5 - Tr(g)^{2\sqrt{3p^m}+2} - Tr(g)^{3+\sqrt{3p^m}} + Tr(g)^{3\sqrt{3p^m}}}{\binom{i_1}{\vdots} Tr(g)^2}} + \frac{Tr(g)^{\sqrt{3p^m}} + Tr(g)}{Tr(g)}}{} + i_2 \right.$$

$$\sqrt{\left\{ \frac{\sqrt{\frac{Tr(gh)^5 - Tr(gh)^{2\sqrt{3p^m}+2} - Tr(gh)^{3+\sqrt{3p^m}} + Tr(gh)^{3\sqrt{3p^m}}}{\binom{k_1}{\vdots} Tr(gh)^2}} + \frac{Tr(gh)^{\sqrt{3p^m}} + Tr(gh)}{Tr(gh)} \right\}^2 - 1} \times$$

$$\setminus[NOBREAK] \frac{\sqrt{\frac{Tr(h)^5 - Tr(h)^{2\sqrt{3p^m}+2} - Tr(h)^{3+\sqrt{3p^m}} + Tr(h)^{3\sqrt{3p^m}}}{\binom{j_1}{\vdots} Tr(h)^2}} + \frac{Tr(h)^{\sqrt{3p^m}} + Tr(h)}{Tr(h)} + }{}$$

$$\left. j_2 \sqrt{\left\{ \frac{\sqrt{\frac{Tr(gh)^5 - Tr(gh)^{2\sqrt{3p^m}+2} - Tr(gh)^{3+\sqrt{3p^m}} + Tr(gh)^{3\sqrt{3p^m}}}{\binom{k_1}{\vdots} Tr(gh)^2}} + \frac{Tr(gh)^{\sqrt{3p^m}} + Tr(gh)}{Tr(gh)} \right\}^2 - 1} \right]$$

Accordingly, it is assumed that the expression of the above output is equal to the expression of multiplication calculated from the input, and the output of $(k_1, k_2, l_1, l_2)$ is calculated from, the input of $(i_1, i_2, j_1, j_2)$.

Thus, the computing device according to the first embodiment operates in the trace representation, without conversion to, for example, the projective representation or the extension field representation. This makes it possible to reduce the entire amount of calculation.

Second Embodiment

In the second embodiment, a multiplication method in the case where all of the coefficients of the characteristic polynomial have been preliminarily determined will be described.

Figure 3:
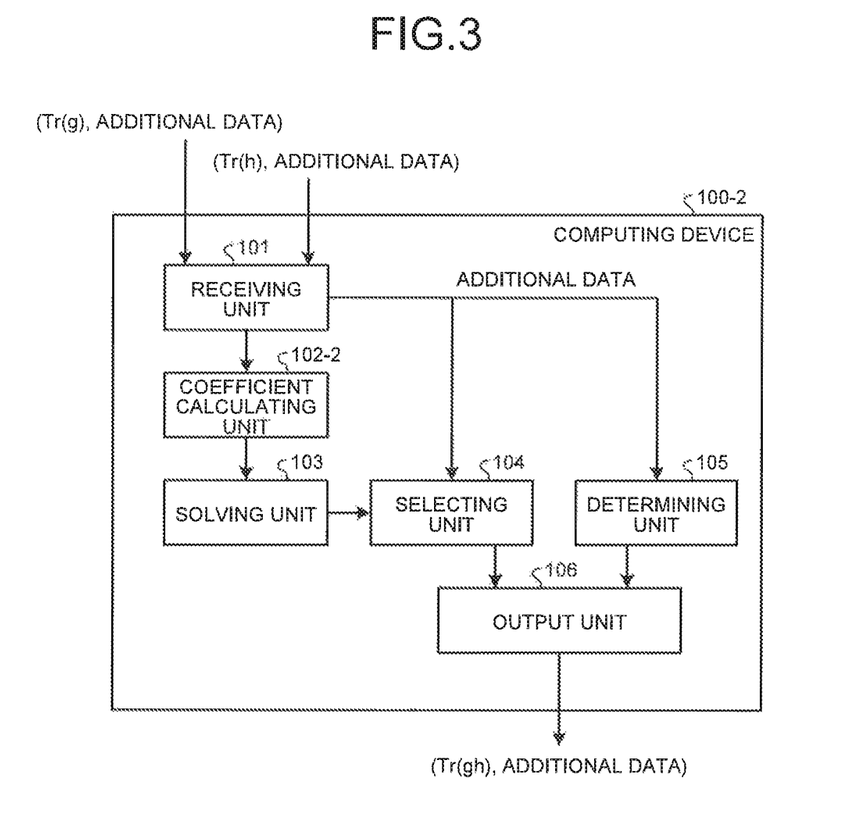
FIG. 3 is a block diagram illustrating a computing device according to a second embodiment.

FIG. 3 is a block diagram illustrating an exemplary configuration of an computing device 100-2 according to a second embodiment. As illustrated in FIG. 3, the computing device 100-2 includes the receiving unit 101, a coefficient calculating unit 102-2, the solving unit 103, the selecting unit 104, the determining unit 105, and the output unit 106.

In the second embodiment, a function of the coefficient calculating unit 102-2 is a different from that of the first embodiment. Configurations and functions are otherwise similar to those in FIG. 1, which is the block diagram illustrating the computing device 100 according to the first embodiment. In view of this, like reference numerals designate units corresponding to or identical to the units according to the first embodiment, and such configurations and functions will not be further elaborated here.

The coefficient calculating unit 102-2 uses a coefficient of a predetermined characteristic polynomial to calculate a coefficient of a polynomial that has a root that is a possible value of the multiplication value. This point is different from the coefficient calculating unit 102 according to the first embodiment. A calculation method for a coefficient according to this embodiment will be described below.

Assume that, the characteristic polynomial expressed in Equation (64) below is given. The norm of the element g in an algebraic torus $T_n(F_{p^m})$ is one. This yields a constant term.

$$X^n - Tr(g)X^{n-1} + a_2(g)X^{n-2} + a_3(g)X^{n-3} + \ldots + a_{n-1}(g)X + (-1)^n \qquad (64)$$

The polynomial expressed in Equation (65) below has a root that is a possible value of the multiplication value. The coefficient of this polynomial is calculated from the coefficient of the characteristic polynomial.

$$Y^n - Tr(g)Tr(h)Y^{n-1} + d_2(g,h)Y^{n-2} + d_3(g,h)Y^{n-3} + \ldots + d_{n-1}(g,h)Y + d_n(g,h) \qquad (65)$$

With respect to $d_2(g, h)$, for example, in the case of n=2, an equation $d_2(g, h) = a_2(g)Tr(h^2) + Tr(g^2)a_2(h)$ holds. In the case of n=3, an equation $d_2(g, h) = a_2(g)Tr(h^2) + Tr(g^2)a_2(h) + a_2(g)a_2(h)$ holds. If n=4, then an equation $d_2(g, h) = a_2(g)Tr(h^2) + Tr(g^2)a_2(h) + a_2(g)a_2(h) + 2a_2(g) + 2a_2(h) = 12$ holds. Here, $a_i(g)$ and $d_i(g, h)$ are expressed in Equation (66). Similarly $d_i(h)$ is expressed.

$$a_i(g) = (-1)^i \sum_{S \subset \{0, \ldots, n-1\}, |S|=i} \prod_{j \in S} g^{(p^m)^j} \quad (66)$$

$$d_i(g, h) = (-1)^i \sum_{S \subset \{0, \ldots, n-1\}, |S|=i} \prod_{j \in S} Tr(g^{(p^m)^j} h)$$

Accordingly, the coefficient calculating unit 102-2 calculates $d_i(g, h)$ from $d_i(g)$, $d_i(h)$, $Tr(g^i)$, and $Tr(h^i)$, using the coefficient of the characteristic polynomial and the recurrence equation of the trace obtained from the characteristic polynomial. This calculates the coefficient of the polynomial that has a root that is a possible value of the multiplication value.

The solving unit 103 solves the above-described polynomial to obtain its root. The selecting unit 104 selects one multiplication value from the obtained n roots, using the additional data corresponding to the coefficient of the characteristic, polynomial with respect to the element g and the additional data corresponding to the coefficient of the characteristic polynomial with respect to the element h. The determining unit 105 uses the additional data corresponding to the coefficient of the characteristic polynomial with respect to the element g and the additional data corresponding to the coefficient of the characteristic polynomial with respect to the element h, and determines the additional data for the multiplication value.

As described above, the first embodiment and the second embodiment allow the computation in the trace representation without conversion of the representation. This makes it possible to reduce the entire amount of calculation.

Figure 4:
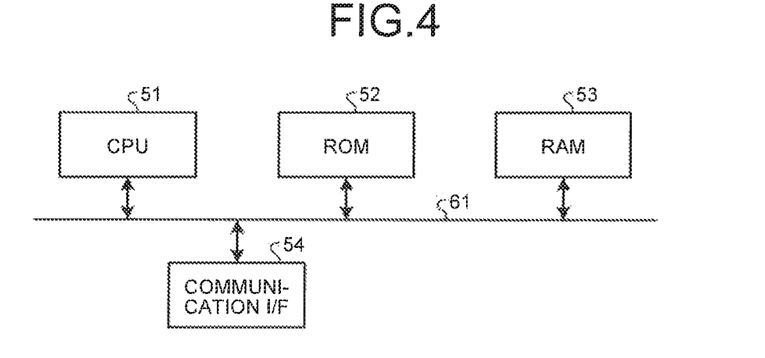
FIG. 4 is a diagram of a hardware configuration of the computing device.

Next, a hardware configuration, of a computing device according to the first embodiment or the second embodiment will be described by referring to FIG. 4. FIG. 4 is an explanatory diagram illustrating a hardware configuration of the computing device according to the first embodiment or the second embodiment.

The computing device according to the first embodiment or the second embodiment includes a control unit such as a central processing unit (CPU) 51, a storage unit such as a read only memory (ROM) 52 and a random access memory (RAM) 53, a communication I/F 54 to connect a network for communication, and a bus 61 to couple to respective units.

The computation program executed in the computing device according to the first embodiment or the second embodiment is preliminarily embedded in a ROM 52 or a similar storage to provide.

The computation program executed in the computing device according to the first embodiment or the second embodiment may be configured to be provided as a computer program product that is in an installable file format or an executable file format and is recorded on a recording medium from which a computer is able to read the program. The recording medium, includes a compact disk read only memory (CD-ROM), a flexible disk (FD), a compact disk recordable (CD-R), and a digital versatile disk (DVD).

The computation program executed in the computing device according to the first embodiment or the second embodiment may be further configured to be stored in a computer connected to a network such as the Internet so as to be provided as a downloadable file over the network. Alternatively, the computation program executed in the computing device according to the first embodiment or the second embodiment may be configured to be provided or distributed through a network such as the Internet.

With the computation program executed in the computing device according to the first embodiment or the second embodiment, a computer may serve as respective units (the receiving unit, the coefficient calculating unit, the solving unit, the selecting unit, the determining unit, and the output unit) of the above-described computing device. A CPU 51 in the computer reads the computation program from the storage medium from which the computer is able to read the program. Then the computation program is loaded and executed on a main storage unit.

While certain embodiments nave been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from, the spirit of the inventions. The accompanying claims and their equivalents are intended to cover such forms or modifications as would fall within the scope and spirit of the inventions.

What is claimed is:

1. A public key cryptography device for reducing computation time when converting between representations of a file, comprising:
    at least one processor; and
    a memory storing instructions, which, when executed by the at least one processor configure the processor to:
        receive, via a hardware interface, a plurality of pieces of input data for public key cryptography indicative of elements of a subgroup of a multiplicative group in a finite field and a plurality of pieces of first additional data for identifying conjugates of the respective pieces of input data, the elements being represented by traces;
        calculate a coefficient of an equation based on the pieces of input data, the equation having a solution that is a possible value as a result of a predetermined computation performed on the pieces of input data;
        obtain a plurality of solutions of the equation having the coefficient by performing a bit inversion in memory;
        select one of the solutions as the result of the predetermined computation, based on the pieces of first additional data;
        determine second additional data for identifying a conjugate of the result of the predetermined computation, based on the pieces of first additional data; and
        output the selected result of the predetermined computation and the second additional data to facilitate converting between representations of a file for public key encryption.

2. The device according to claim 1, wherein a coefficient of characteristic polynomial is used for the pieces of input data and the pieces of input data to calculate the coefficient of the equation.

3. The according to claim 1, wherein
    each of the pieces of first additional data indicates an order of value in the corresponding piece of input data and the corresponding conjugate, and
    the selected solution is determined based on a combination of orders indicated by the pieces of first additional data.

* * * * *